US011960677B2

(12) United States Patent
Takada et al.

(10) Patent No.: US 11,960,677 B2
(45) Date of Patent: Apr. 16, 2024

(54) SENSOR DEVICE WITH TIMING CONTROL CIRCUIT OUTPUTTING INVERTED POLARITY SIGNAL TO THE FLOATING GROUND AND SENSING ELECTRODES

(71) Applicant: Japan Display Inc., Tokyo (JP)

(72) Inventors: Naoki Takada, Tokyo (JP); Hiroshi Yamaguchi, Tokyo (JP); Kisho Yamamoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 9 days.

(21) Appl. No.: 17/825,791

(22) Filed: May 26, 2022

(65) Prior Publication Data

US 2022/0283689 A1 Sep. 8, 2022

Related U.S. Application Data

(63) Continuation of application No. PCT/JP2020/039996, filed on Oct. 23, 2020.

(30) Foreign Application Priority Data

Nov. 29, 2019 (JP) ................................. 2019-216570

(51) Int. Cl.
*G06F 3/041* (2006.01)
*G06F 3/044* (2006.01)

(52) U.S. Cl.
CPC ........ *G06F 3/04166* (2019.05); *G06F 3/0445* (2019.05)

(58) Field of Classification Search
CPC ............... G06F 3/04166; G06F 3/0445; G06F 2203/04107
See application file for complete search history.

(56) References Cited

U.S. PATENT DOCUMENTS

| 2011/0261006 | A1* | 10/2011 | Joharapurkar | ......... H03K 17/96 345/174 |
| 2012/0188200 | A1 | 7/2012 | Roziere | |
| 2018/0260067 | A1* | 9/2018 | Choi | .................... G06F 3/04166 |
| 2019/0121468 | A1* | 4/2019 | Jun | ......................... G06F 3/045 |
| 2019/0163299 | A1* | 5/2019 | Nakanishi | ............. G06F 3/0446 |
| 2019/0265835 | A1* | 8/2019 | Shin | ...................... G09G 3/3233 |
| 2019/0384457 | A1* | 12/2019 | Fujiyoshi | ............... G06F 3/0446 |

* cited by examiner

*Primary Examiner* — Liliana Cerullo
(74) *Attorney, Agent, or Firm* — K&L Gates LLP

(57) ABSTRACT

According to one embodiment, a sensor device includes a panel and a control circuit. The panel includes an insulating layer, a first electrode, and a second electrode. The control circuit including a first circuit including a timing control circuit and a first amplifier, and a second circuit including a detection circuit connected to a floating ground line. During a first sensing drive period, the first output unit outputs a first synchronization signal, the timing control circuit outputs a second synchronization signal, the first amplifier provides the amplified second synchronization signal to each of the floating ground line and the first electrode, and the detector reads a change in a sensor signal.

8 Claims, 26 Drawing Sheets

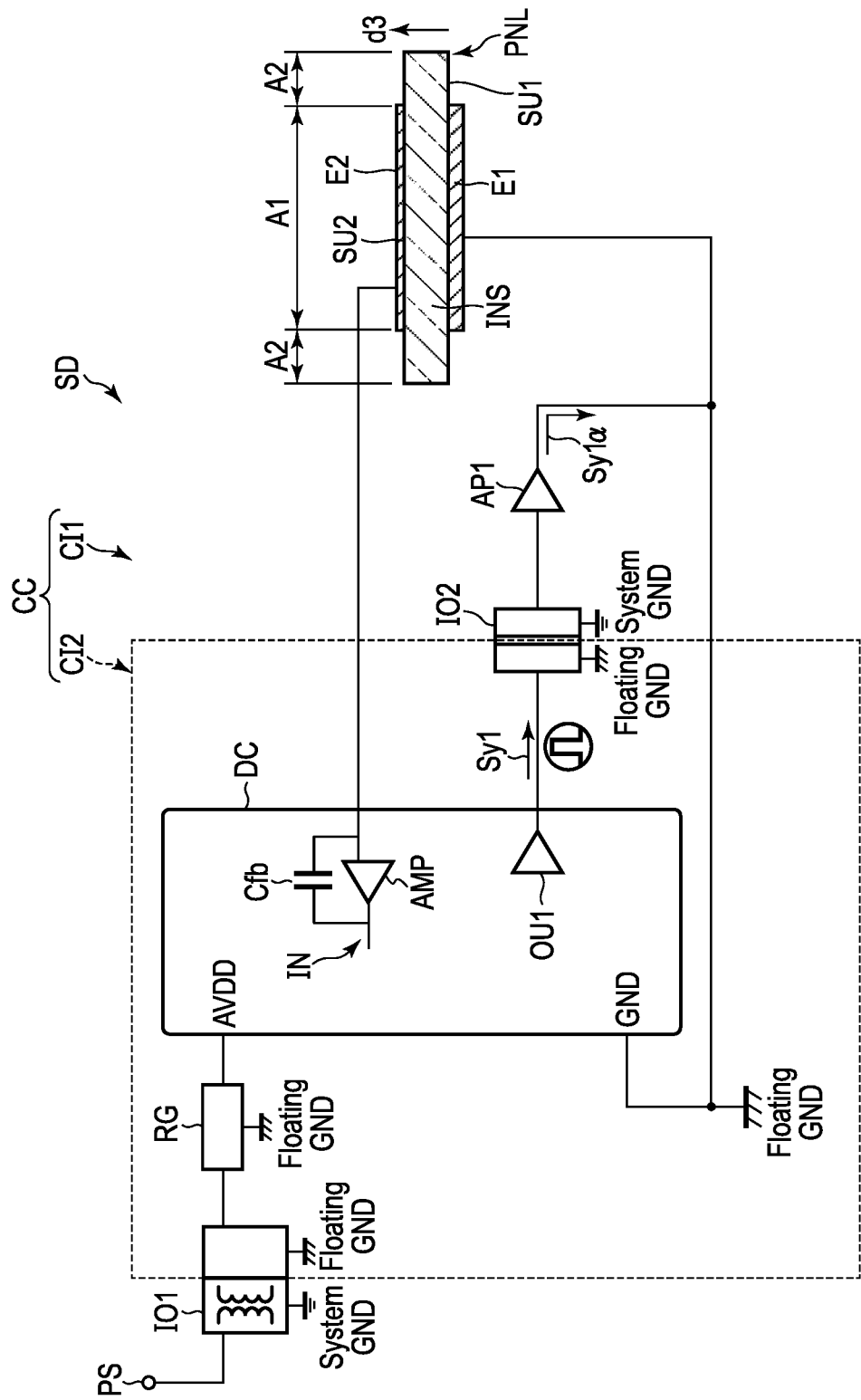
F I G. 1

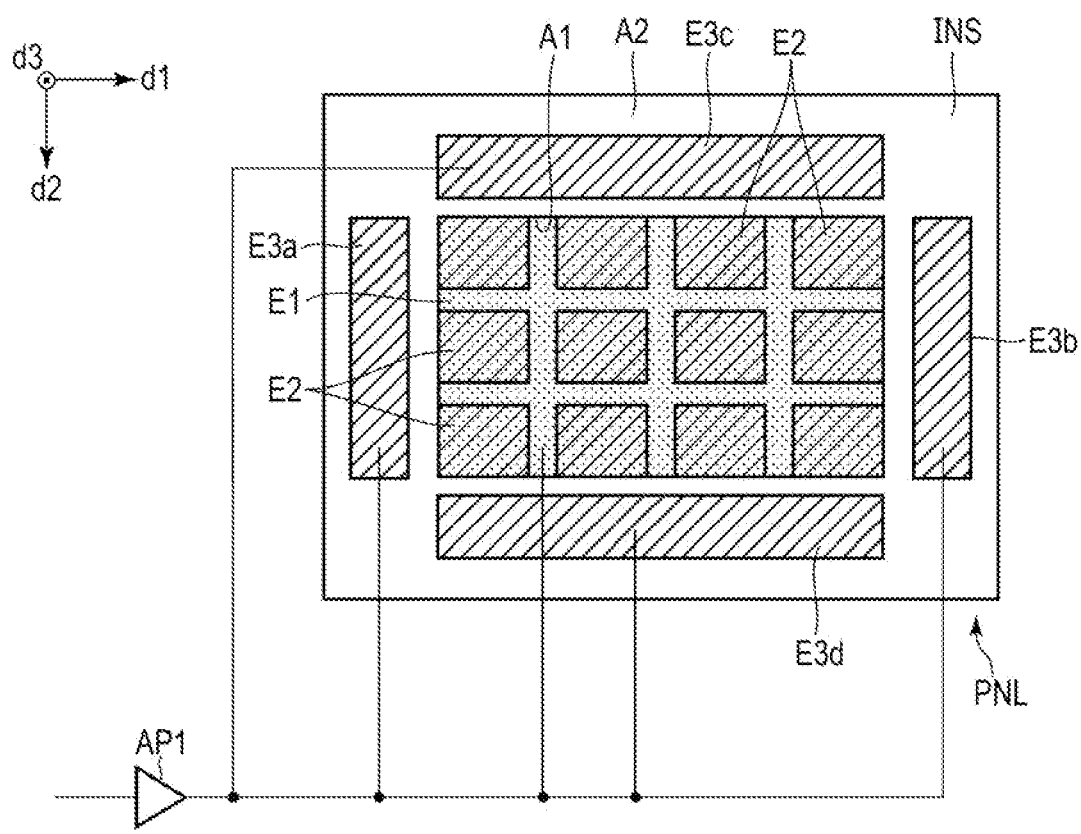
F I G. 4

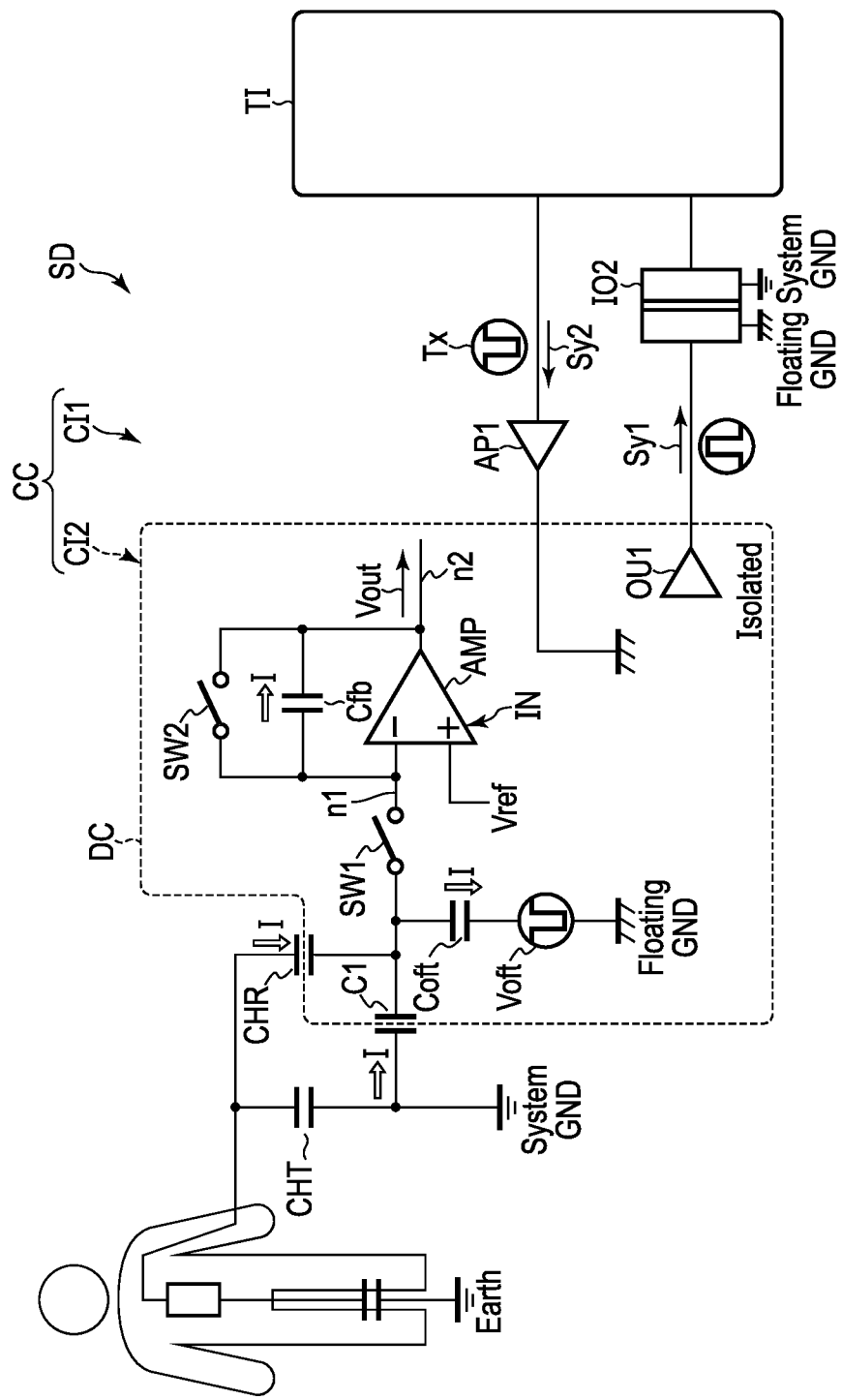
F I G. 5

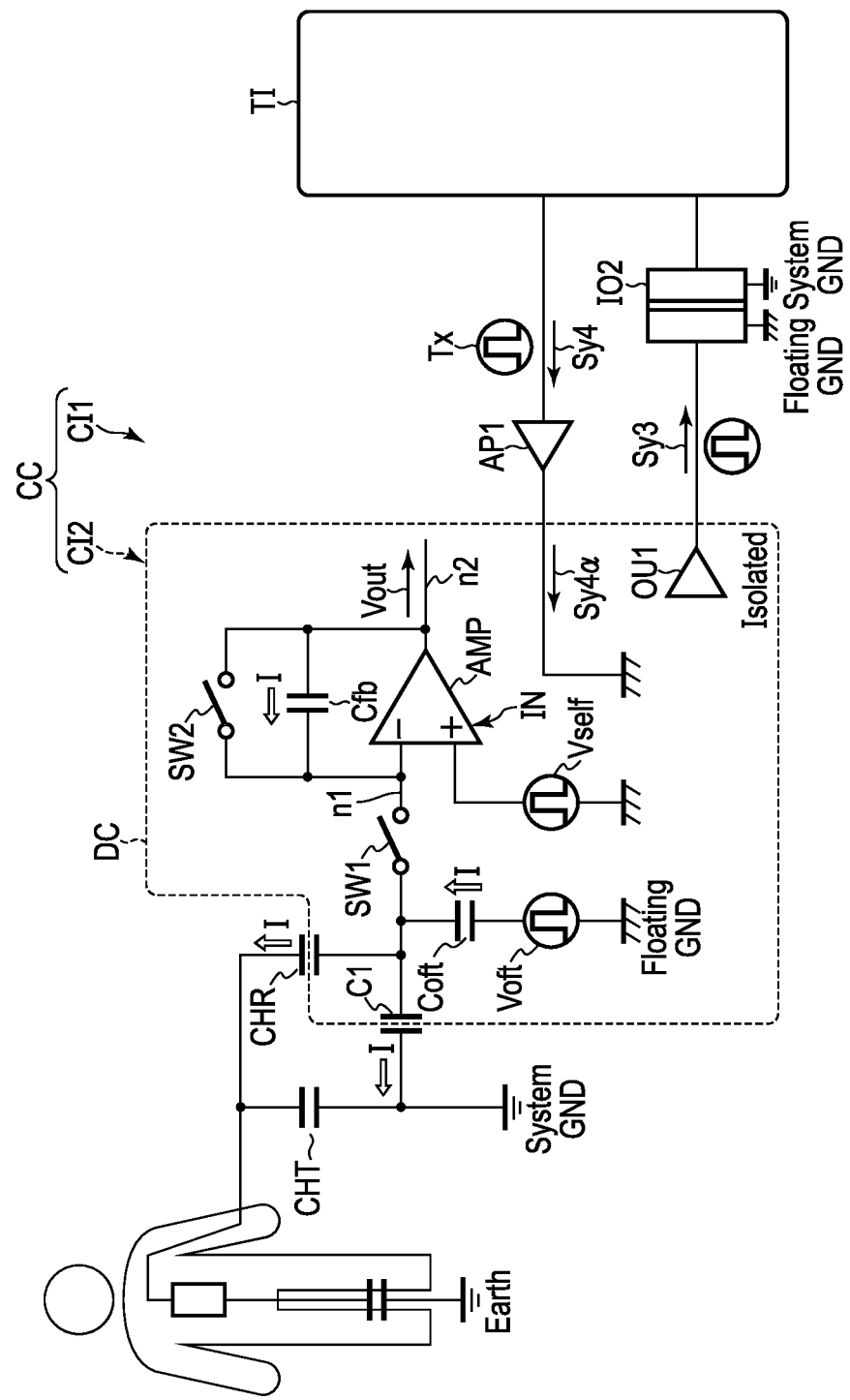
F I G. 9

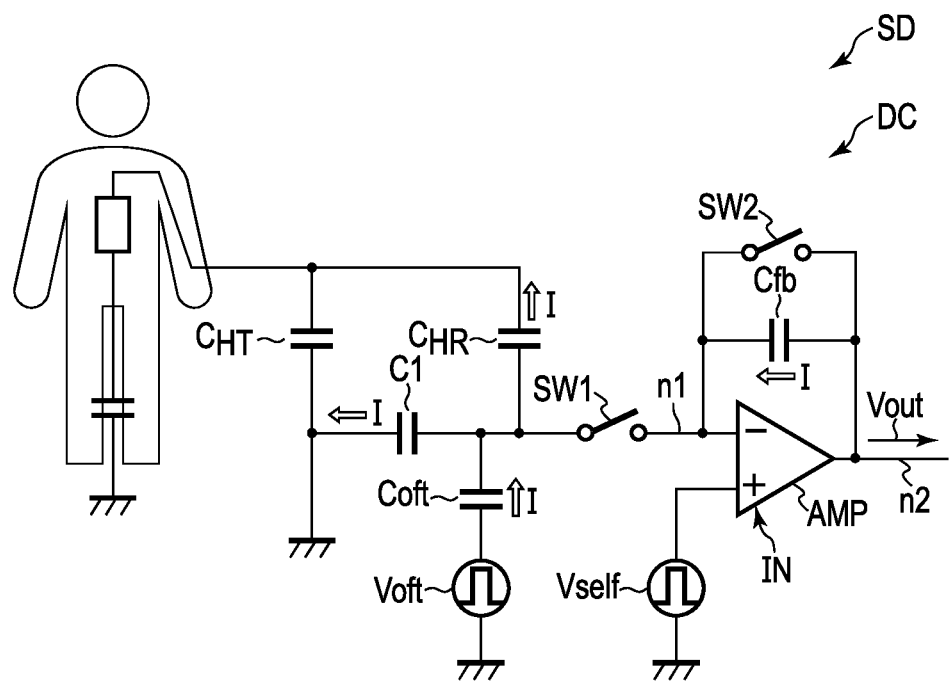
F I G. 10

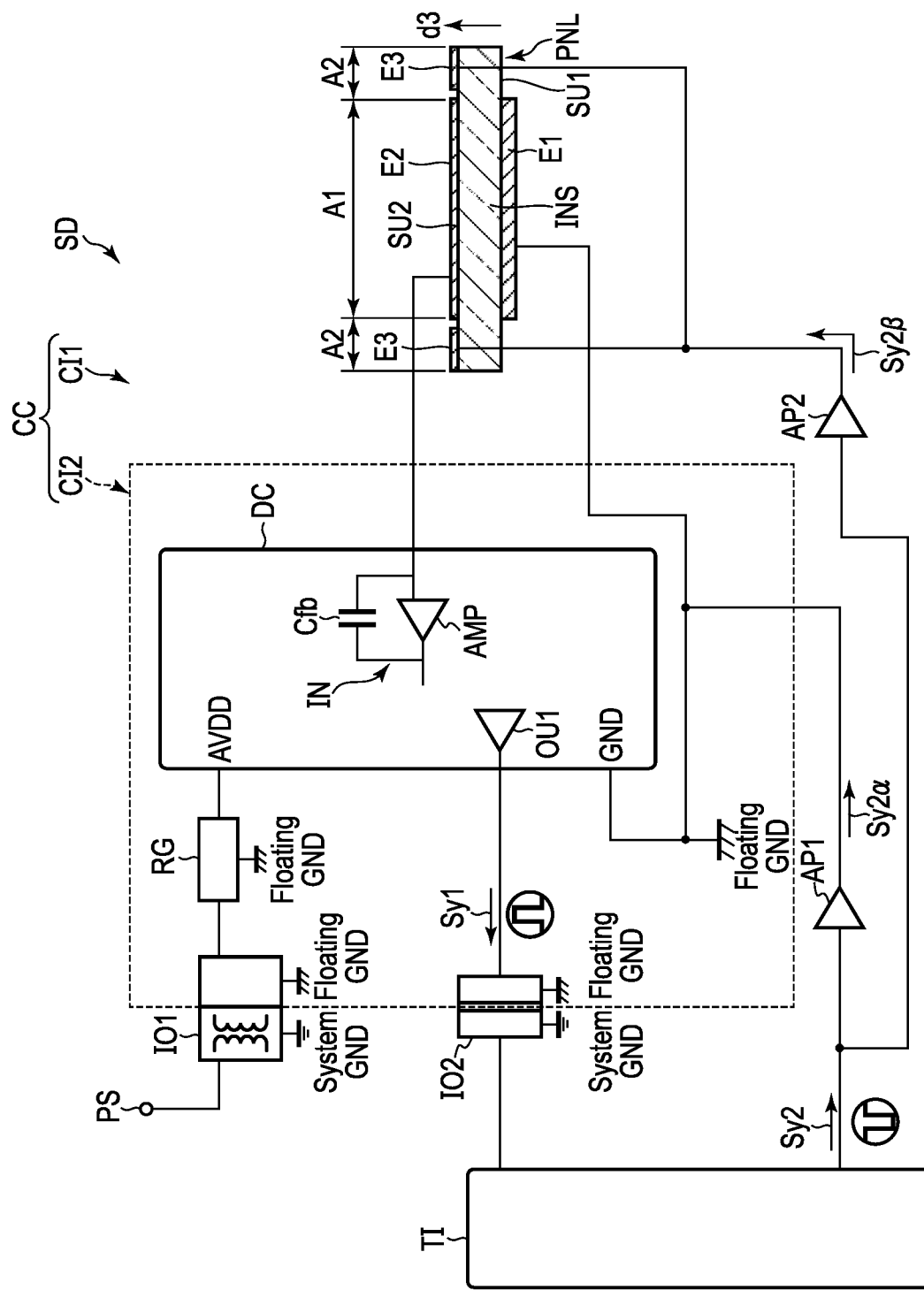
F I G. 11

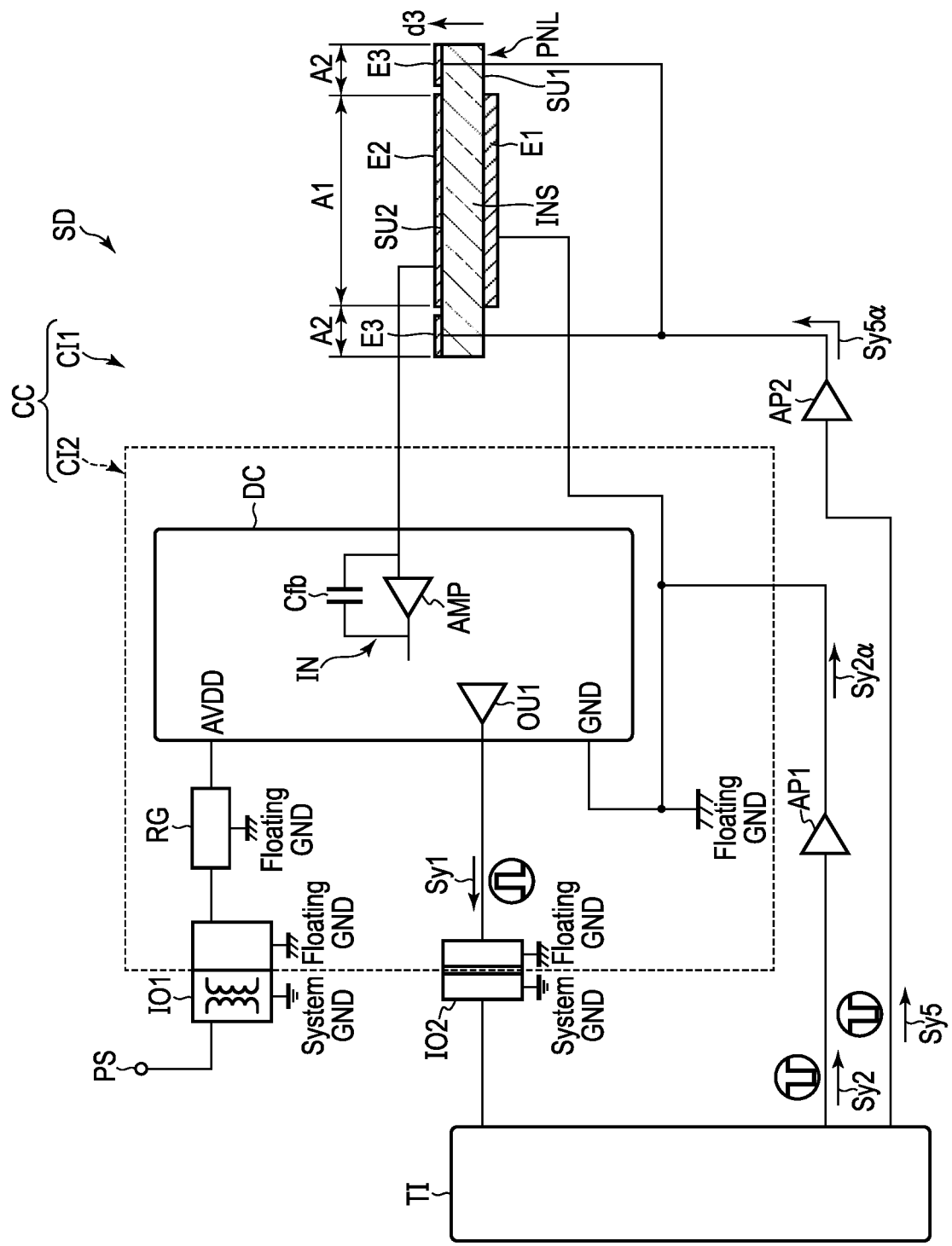
F I G. 12

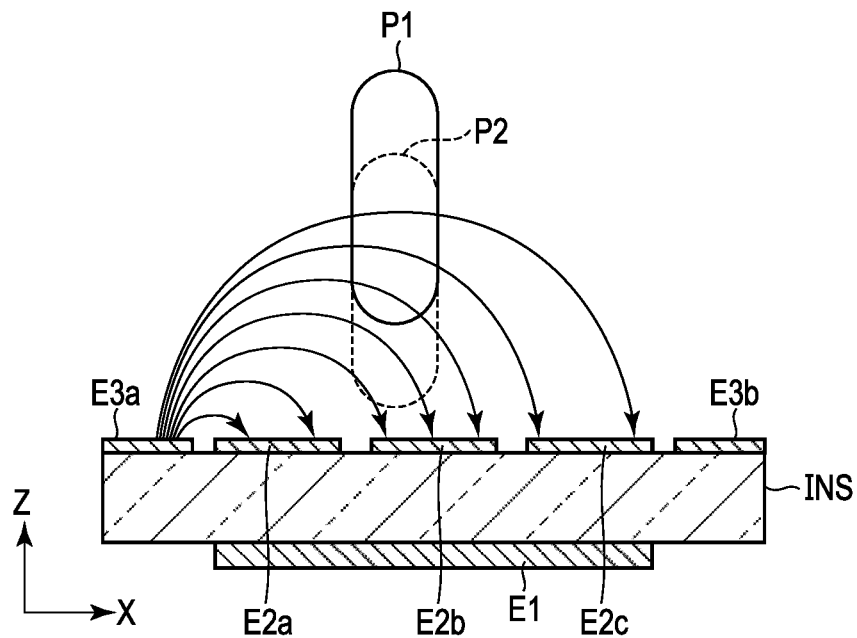
F I G. 16
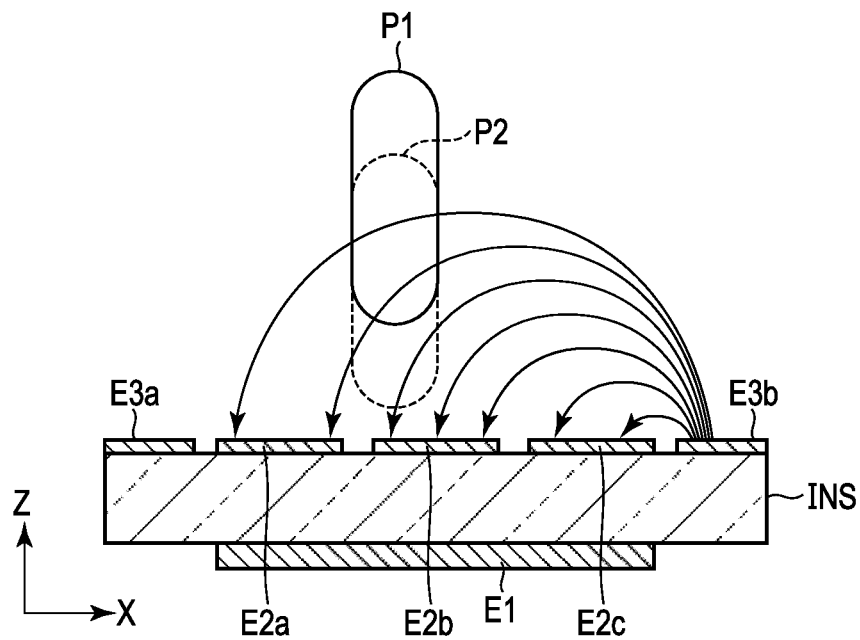
F I G. 17

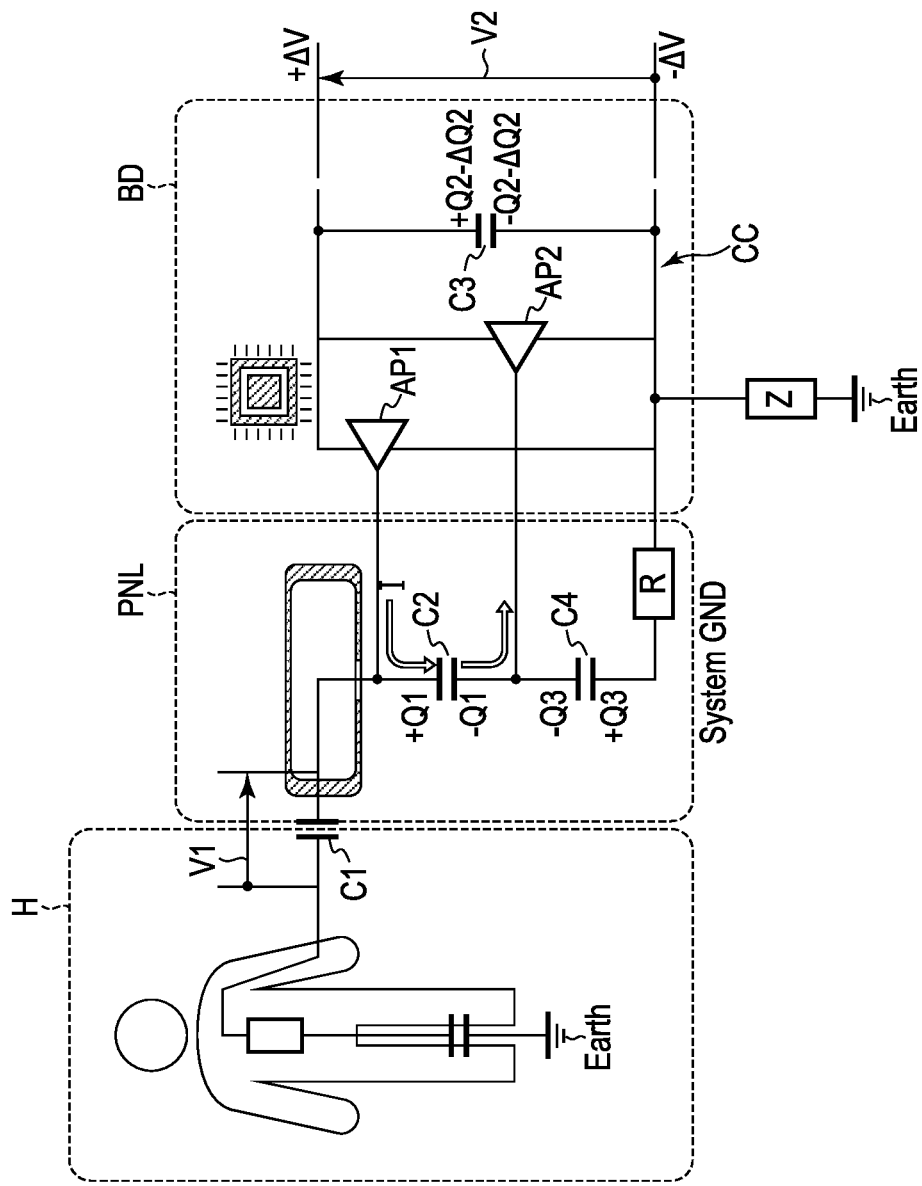
F I G. 20

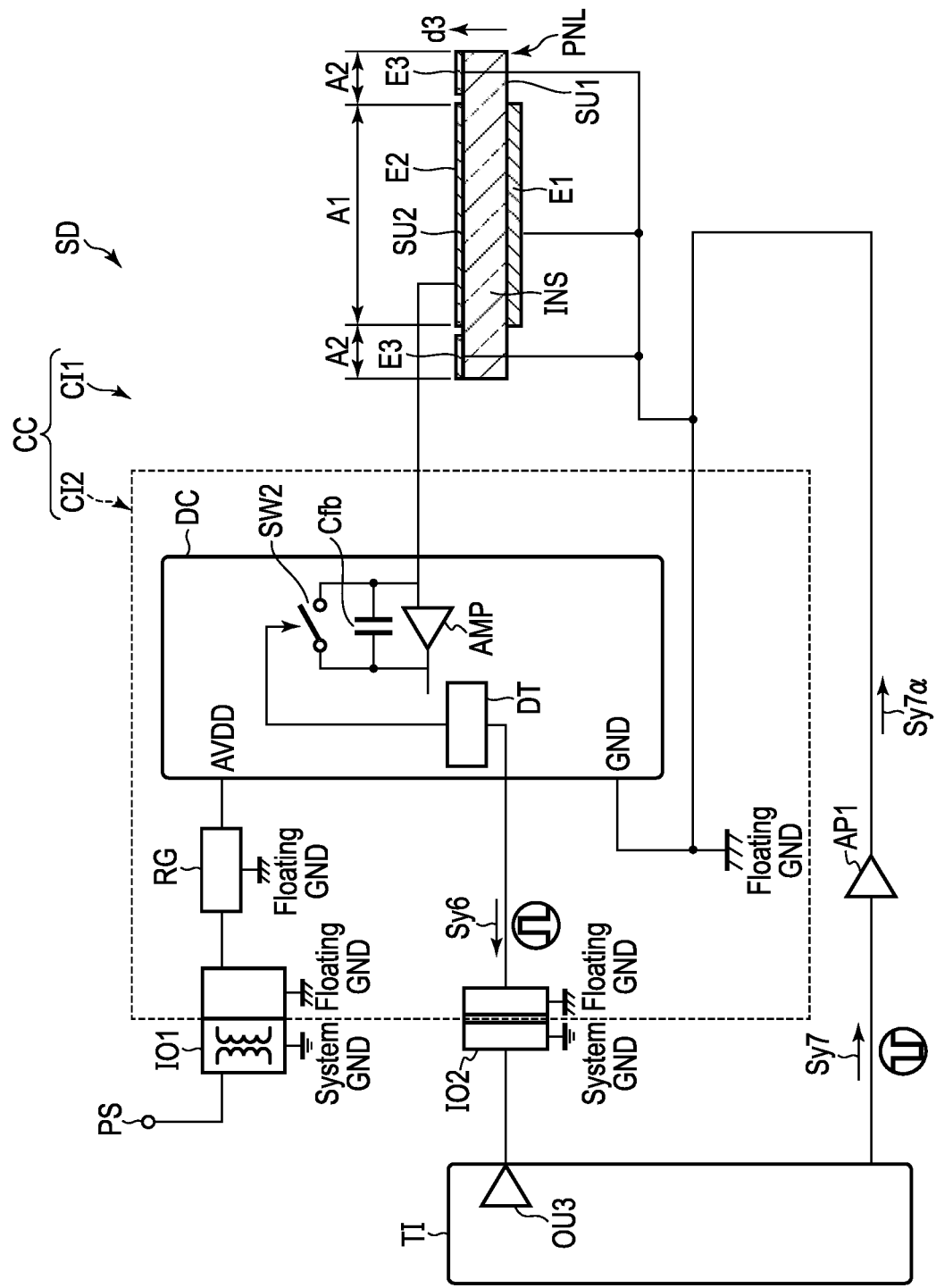
F I G. 22

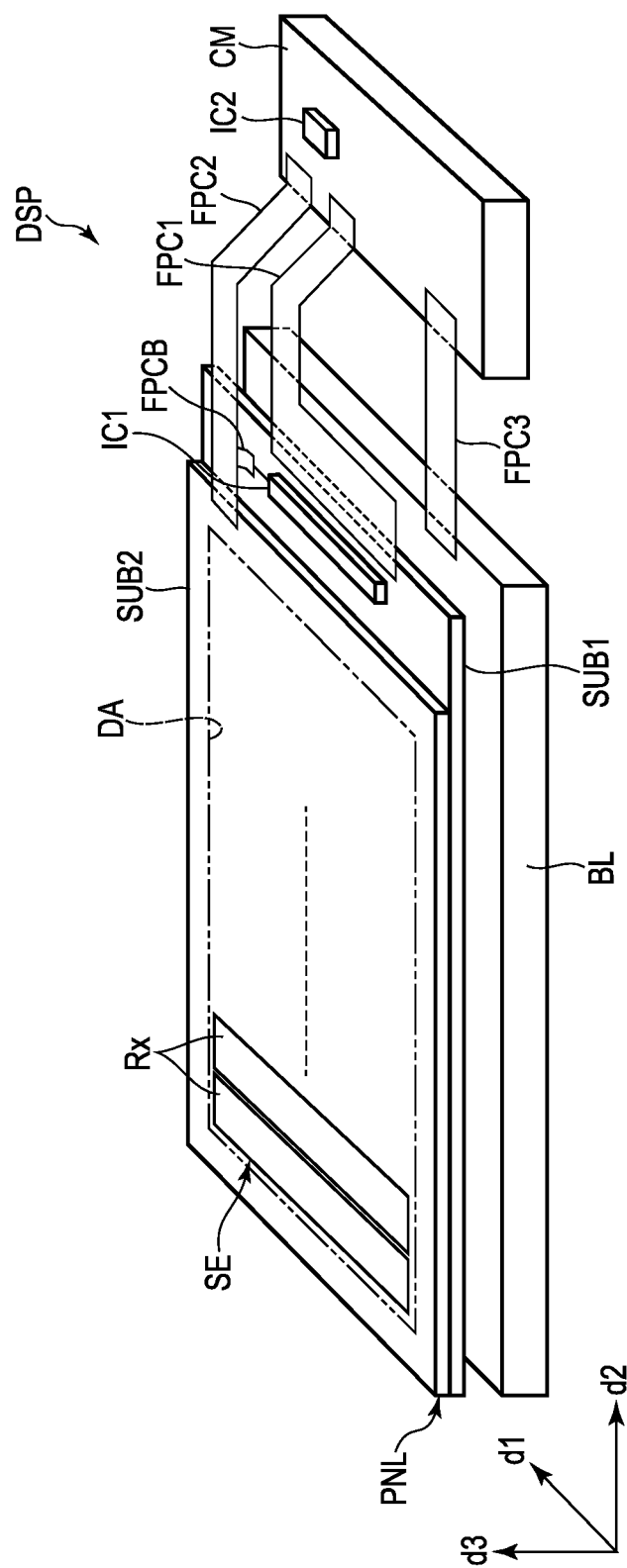
F I G. 23

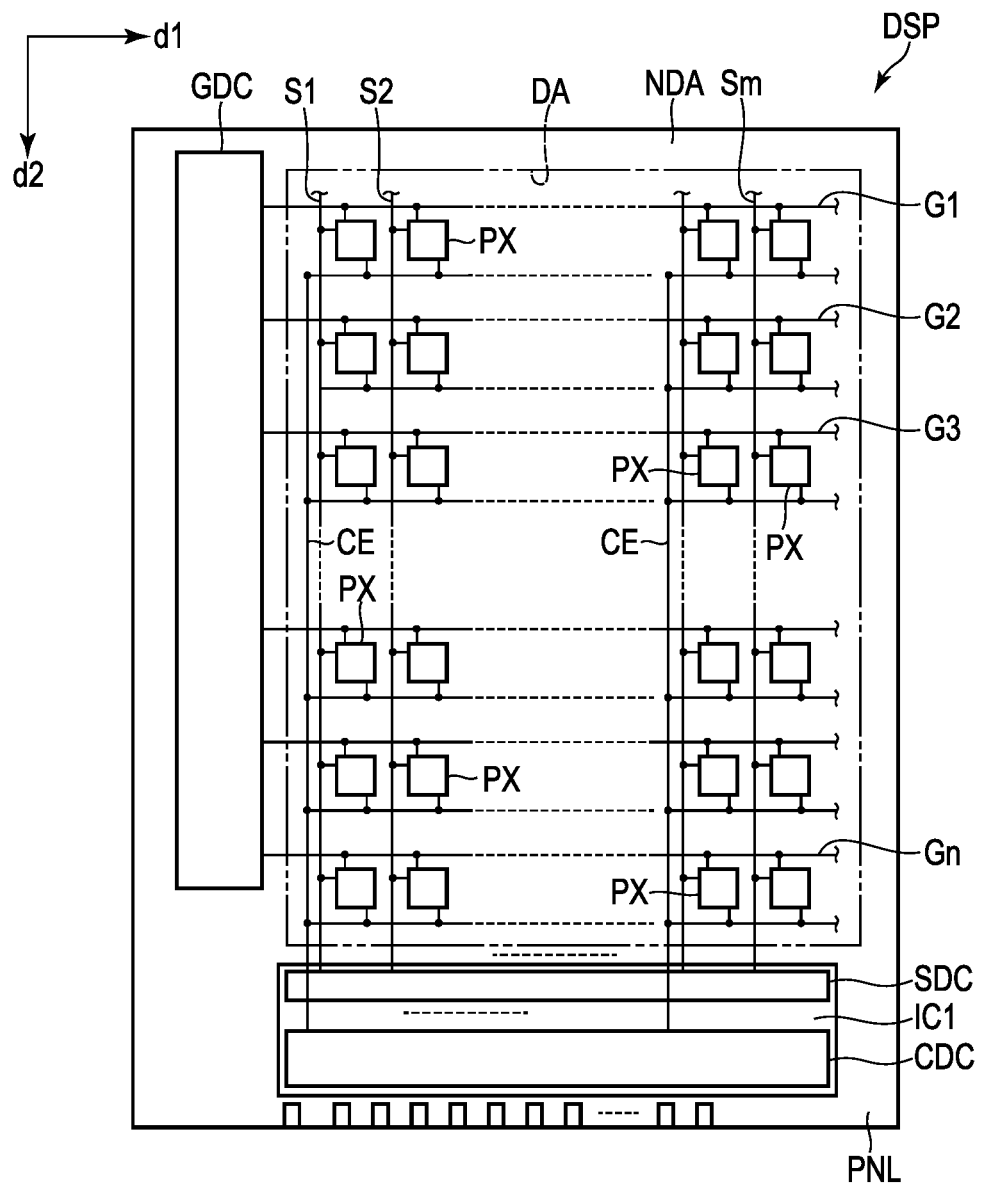
F I G. 24

SENSOR DEVICE WITH TIMING CONTROL CIRCUIT OUTPUTTING INVERTED POLARITY SIGNAL TO THE FLOATING GROUND AND SENSING ELECTRODES

CROSS-REFERENCE TO RELATED APPLICATIONS

This application is a Continuation application of PCT Application No. PCT/JP2020/039996, filed Oct. 23, 2020 and based upon and claiming the benefit of priority from Japanese Patent Application No. 2019-216570, filed Nov. 29, 2019, the entire contents of all of which are incorporated herein by reference.

FIELD

Embodiments described herein relate generally to a sensor device.

BACKGROUND

In general, display devices applicable to personal digital assistants (PDAs) and personal computers (tablet PCs) have, for example, capacitive sensors, and are configured to detect data input directly from a display screen using an input means. As the input means, conductive objects such as a conductor, finger, etc., can be used. The above display device can be, for example, an in-cell type display device in which electrodes forming the above sensor are provided inside a display panel, or an on-cell type display device in which electrodes forming the above sensor are provided on the display surface of a display panel.

Electrodes forming the above sensor are located in a display area where an image is displayed, and detect changes in electrostatic capacitance. Therefore, the display device can detect input information by the input means by extracting the change in electrostatic capacitance (strength of electrostatic capacitive coupling) generated at the above electrodes when the input means comes close to the electrodes.

BRIEF DESCRIPTION OF THE DRAWINGS

FIG. 1 is a circuit diagram showing a sensor device according to a comparative example.
FIG. 4 is a plan view of a panel shown in FIG. 3.
FIG. 5 is a circuit diagram for explaining a first sensing drive by the sensor device according to the first embodiment.
FIG. 9 is a circuit diagram for explaining a second sensing drive by the sensor device according to the third embodiment.
FIG. 10 is a circuit diagram for explaining a comparative example of the second sensing drive.
FIG. 11 is a circuit diagram showing a sensor device according to a fourth embodiment.
FIG. 12 is a circuit diagram showing a sensor device according to a fifth embodiment.
FIG. 16 is a diagram for explaining a first sensing drive by a sensor device according to a modified example 2 of the sixth embodiment, and is a cross-sectional view showing a panel.
FIG. 17 is another diagram for explaining the first sensing drive by the sensor device according to the modified example 2 of the sixth embodiment, and is a cross-sectional view showing a panel.
FIG. 20 is a circuit diagram for explaining a first sensing drive by the sensor device according to a seventh embodiment.
FIG. 22 is a circuit diagram showing a sensor device according to an eighth embodiment.
FIG. 23 is a perspective view showing a configuration of a display device according to a ninth embodiment.
FIG. 24 shows a basic configuration and an equivalent circuit of the display device.

DETAILED DESCRIPTION

Figure 2:
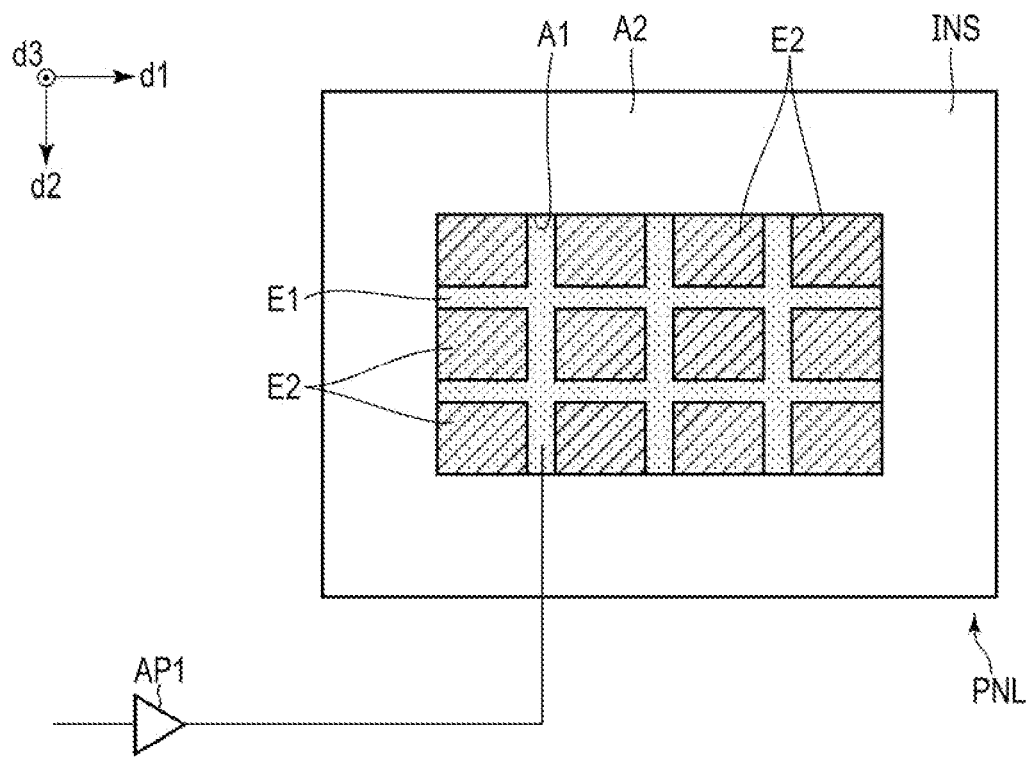
FIG. 2 is a plan view of a panel shown in FIG. 1.

In general, according to one embodiment, there is provided a sensor device comprising: a panel including an insulating layer, a first electrode provided on a first main surface side of the insulating layer, and a second electrode provided on a second main surface side opposite the first main surface of the insulating layer and sandwiching the insulating layer together with the first electrode; and a control circuit including a first circuit including a timing control circuit and a first amplifier, and a second circuit including a detection circuit connected to a floating ground line and electrically isolated from the first circuit, the detection circuit including a detector electrically connected to the second electrode, and a first output unit, during a first sensing drive period, the first output unit outputting a first synchronization signal, the timing control circuit outputting a second synchronization signal generated based on the first synchronization signal and having a polarity inverted from the polarity of the first synchronization signal, the first amplifier amplifying the second synchronization signal and providing the amplified second synchronization signal to each of the floating ground line and the first electrode, and the detector reading a change in a sensor signal generated at the second electrode.

According to another embodiment, there is provided a sensor device comprising: a panel including an insulating layer, a first electrode provided on a first main surface side of the insulating layer, a second electrode provided on a second main surface side opposite the first main surface of the insulating layer and sandwiching the insulating layer together with the first electrode, and a third electrode provided on the second main surface side of the insulating layer; and a control circuit including a first circuit including a timing control circuit, a first amplifier, and a second amplifier, and a second circuit including a detection circuit connected to a floating ground line and electrically isolated from the first circuit, the first electrode and the second electrode being located in a first area, the third electrode being located in a second area outside of the first area, the detection circuit including a detector electrically connected to the second electrode, and a first output unit, during a first sensing drive period, the first output unit outputting a first synchronization signal, the timing control circuit outputting a second synchronization signal generated based on the first synchronization signal and having a polarity inverted from the polarity of the first synchronization signal, and outputting a fifth synchronization signal generated based on the first synchronization signal and having the same polarity as that of the first synchronization signal, the first amplifier amplifying the second synchronization signal and providing the amplified second synchronization signal to each of the floating ground line and the third electrode, the second amplifier amplifying the fifth synchronization signal and providing the amplified fifth synchronization signal to the first electrode, and the detector reading a change in a sensor signal generated at the second electrode.

According to another embodiment, there is provided a sensor device comprising: a panel including an insulating layer, a first electrode provided on a first main surface side of the insulating layer, a second electrode provided on a second main surface side opposite a first main surface of the insulating layer and sandwiching the insulating layer together with the first electrode; and a control circuit including a first circuit including a timing control circuit and a first amplifier, and a second circuit including a detection circuit connected to a floating ground line and electrically isolated from the first circuit, the detection circuit including a detector electrically connected to the second electrode, during a first sensing drive period, the timing control circuit outputting a sixth synchronization signal and a seventh synchronization signal having a polarity inverted from the polarity of the sixth synchronization signal, respectively, the first amplifier amplifying the seventh synchronization signal, and providing the amplified seventh synchronization signal to each of the floating ground line and the first electrode, and the detector reading a change in a sensor signal generated at the second electrode in synchronization with the sixth synchronization signal.

Embodiments and comparative examples will be described hereinafter with reference to the accompanying drawings. Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof may be omitted unless otherwise necessary.

In the following description, a direction from a first electrode E1 toward a second electrode E2 is referred to as above (or simply on). A direction from the second electrode E2 toward the first electrode E1 is referred to as below (or simply under). In addition, in a case where descriptions such as "a second member above a first member" and "a second member below a first member" are used, the second member may be in contact with the first member, or may be located separately from the first member. In the latter case, a third member may be interposed between the first member and the second member. On the other hand, in a case where descriptions such as "a second member on a first member" and "a second member under the first member" are used, the second member is in contact with the first member.

Comparative Example

First, a sensor device SD according to a comparative example will be described. FIG. 1 is a circuit diagram showing the sensor device SD according to the present comparative example. FIG. 2 is a plan view of a panel PNL shown in FIG. 1. In FIG. 2, a first electrode E1 is shown by a dotted pattern and a second electrode E2 is shown by diagonal lines.

As shown in FIG. 1, the sensor device SD comprises the panel PNL and a control circuit CC configured to control driving the panel PNL.

As shown in FIG. 1 and FIG. 2, the panel PNL is a sensor panel and has an insulating layer INS, the first electrode E1, and the second electrode E2.

The insulating layer INS is formed of insulating materials such as glass and resin. In the present comparative example, the insulating layer INS is formed of glass and is light transmissive. In that case, the insulating layer INS may be referred to as a glass substrate. The insulating layer INS has a first main surface SU1 and a second main surface SU2 opposite to the first main surface SU1. The insulating layer INS is located in a first area A1 and a second area A2 outside of the first area A1. In the present comparative example, the first area A1 has a quadrangular shape, and the second area A2 has a rectangular frame shape and surrounds the first area A1.

The first electrode E1 is provided on the first main surface SU1 side of the insulating layer INS. In other words, the first electrode E1 is provided above the insulating layer INS. The first electrode E1 is located in the first area A1 and is not located in the second area A2. In the present comparative example, the first electrode E1 is a single electrode and has a quadrangular shape. In the present comparative example, the first electrode E1 functions as a sensor drive electrode.

The second electrode E2 is provided on the second main surface SU2 side of the insulating layer INS. In other words, the second electrode E2 is provided below the insulating layer INS. The second electrode E2 sandwiches the insulating layer INS together with the first electrode E1. The second electrode E2 is located in the first area A1 and is not located in the second area A2. In the present comparative example, the panel PNL has a plurality of second electrodes E2. The plurality of second electrodes E2 are provided in a matrix in a first direction d1 and a second direction d2. Each of the second electrodes E2 has a quadrangular shape. In the present comparative example, the second electrode E2 functions as a detection electrode.

The first direction d1 and the second direction d2 are orthogonal to each other; however, they may intersect at an angle other than 90°. A third direction d3 is orthogonal to the first direction d1 and the second direction d2, respectively.

The first electrode E1 and the second electrode E2 are formed of transparent conductive materials such as indium tin oxide (ITO), indium zinc oxide (IZO), and zinc oxide (ZnO).

However, the materials used for the first electrode E1 and the second electrode E2 are not limited to transparent conductive materials, and metals may be used instead of the transparent conductive materials. In that case, the insulating layer INS does not have to be light transmissive.

As shown in FIG. 1, the control circuit CC includes a first circuit CI1 and a second circuit CI2 that is electrically isolated from the first circuit CI1. In the drawing, the second circuit CI2 is shown enclosed in a dashed line. For example, in a case where the first circuit CI1 and the second circuit CI2 are formed using a printed circuit board (PCB), the second circuit CI2 is an electrically isolated part of the printed circuit board. The first circuit CI1 includes a first amplifier AP1, a part of an isolator IO1 using a transformer, and a part of an isolator IO2 using a capacitor.

The second circuit CI2 includes a detection circuit DC, a low dropout (LDO) regulator RG as a linear regulator, a part of the isolator IO1, and a part of the isolator IO2. In the second circuit CI2, the detection circuit DC, the LDO regulator RG, the isolator IO1, and the isolator IO2 are connected to a floating ground line (floating GND line), respectively.

On the other hand, in the first circuit CI1, the isolator IO1 and the isolator IO2 are connected to a system ground line (system GND line), respectively.

The detection circuit DC is configured by an integrated circuit (Touch IC). The detection circuit DC includes a power supply terminal AVDD connected to the LDO regulator RG and a ground terminal GND connected to the floating GND line. The isolator IO1 and the LDO regulator RG are connected between a power supply PS and the power supply terminal AVDD.

In the power supply PS, for example, an output voltage is 5 V. The voltage output by the power supply PS is given to the power supply terminal AVDD of the detection circuit DC through the isolator IO1 and the LDO regulator RG.

The detection circuit DC also includes a detector IN and a first output unit OU1. The detector IN is electrically connected to the second electrode E2. In the present comparative example, the detection circuit DC includes a plurality of detectors IN, and the detectors IN are connected to the second electrode E2 on a one-to-one basis. The detector IN is configured by an integrator, and includes an operation amplifier AMP and a capacitor $C_{fb}$.

The first output unit OU1 is configured by an amplifier. The isolator IO2 is connected between the first output unit OU1 and the first amplifier AP1. The first output unit OU1 is configured to output a first synchronization signal Sy1 with a pulse waveform.

Next, a first sensing drive in the present comparative example will be explained. A first sensing mode for the first sensing drive may be referred to as a mutual-capacitive sensing mode. During a first sensing drive period, the first output unit OU1 outputs the first synchronization signal Sy1, and the first synchronization signal Sy1 is given to the first amplifier AP1 through the isolator IO2. The first amplifier AP1 amplifies the first synchronization signal Sy1, and an amplified first synchronization signal Sy1α is given to each of the floating ground line and the first electrode E1. Subsequently, the detector IN reads the change in a sensor signal generated at the second electrode E2.

According to the sensor device SD of the comparative example configured as described above, in a case where firmware (FW) correction is possible, the first synchronization signal Sy1 is given to the floating ground line, a ground line modulation is performed, and an input by an input means can be detected. The input means can be a conductive object such as a conductor or a finger. In that case, coordinates in the first direction d1 and the second direction d2, and a distance from the second electrode E2 to the input means in the third direction d3 can be detected.

As described above, in the case where FW correction is possible, the input by the input means can be detected satisfactorily. However, in a case where the FW correction is not possible, it is difficult to detect the input by the input means satisfactorily. Therefore, the following describes an embodiment that can detect the input by the input means satisfactorily even in a case where the FW correction is not possible.

First Embodiment

Figure 3:
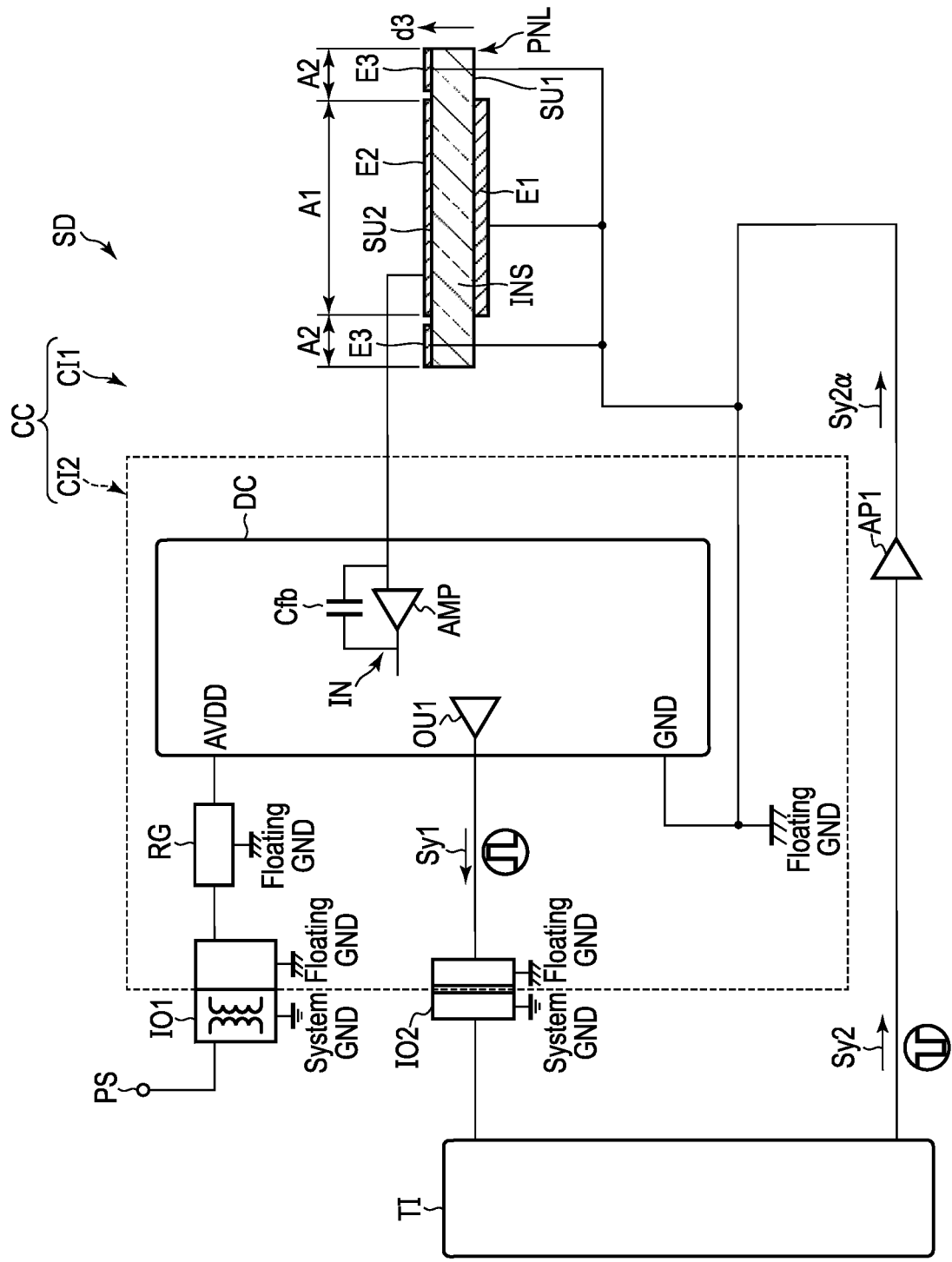
FIG. 3 is a circuit diagram showing a sensor device according to a first embodiment.

Next, a sensor device SD according to a first embodiment will be described. FIG. 3 is a circuit diagram showing the sensor device SD according to the first embodiment. FIG. 4 is a plan view of a panel PNL shown in FIG. 3. In FIG. 4, a first electrode E1 is shown by a dotted pattern and a second electrode E2 is shown by diagonal lines.

As shown in FIG. 3 and FIG. 4, the panel PNL further includes a third electrode E3. The third electrode E3 is provided on a second main surface SU2 side of an insulating layer INS. The third electrode E3 is located in a second area A2 and is provided with an insulating distance to the second electrode E2. In the present first embodiment, the panel PNL has a plurality of third electrodes E3. The plurality of third electrodes E3 are arranged in a manner surrounding a first area A1.

The plurality of third electrodes E3 include a third electrode E3a, a third electrode E3b, a third electrode E3c, and a third electrode E3d. The third electrode E3a and the third electrode E3b extend in a second direction d2, have a strip-like shape, and sandwich the first area A1 (a plurality of second electrodes E2) in a first direction d1, respectively. The third electrode E3c and the third electrode E3d extend in the first direction d1, have a strip-like shape, and sandwich the first area A1 (the plurality of second electrodes E2) in the second direction d2, respectively. In the present first embodiment, the third electrode E3 functions as a shield electrode. Furthermore, the first electrode E1 functions as a sensor drive electrode, and the second electrode E2 functions as a detection electrode.

Note that the number of third electrodes E3 that the panel PNL has, the shape of the third electrodes E3, and the arrangement of the third electrodes E3 are not limited to the present first embodiment, and can be varied in various ways. For example, the third electrodes E3 do not have to surround the first area A1, and may be arranged only in an area of the second area A2 where the first area A1 is desired to be electrically shielded.

Alternatively, the panel PNL may be configured without the third electrode E3.

As shown in FIG. 3, a first circuit CI1 further includes a timing control circuit TI. The timing control circuit TI is configured by a timing generator, which is a field programmable gate array (FPGA). In the timing control circuit TI, an input terminal is connected to an isolator IO2, and an output terminal is connected to a first amplifier AP1. The first amplifier AP1 is connected to the plurality of third electrodes E3 in addition to the floating ground line and the first electrode E1.

Next, a first sensing drive in the present first embodiment will be described.

As shown in FIG. 3, during a first sensing drive period, a first output unit OU1 outputs a first synchronization signal Sy1, and the first synchronization signal Sy1 is given to the timing control circuit TI through the isolator IO2. The timing control circuit TI outputs a second synchronization signal Sy2, which is generated based on the first synchronization signal Sy1 and has a polarity inverted from the polarity of the first synchronization signal Sy1. The second synchronization signal Sy2 is given to the first amplifier AP1. The first amplifier AP1 amplifies the second synchronization signal Sy2, and an amplified second synchronization signal Sy2α is given to each of the floating ground line and the first electrode E1. Subsequently, a detector IN reads the change in a sensor signal generated at the second electrode E2.

In the present first embodiment, the panel PNL includes the third electrode E3. Therefore, during the first sensing drive period, the first amplifier AP1 gives the amplified second synchronization signal Sy2a not only to the floating ground line and the first electrode E1, but also to the third electrode E3.

Next, the first sensing drive according to the present first embodiment will be described in more detail. FIG. 5 is a circuit diagram for explaining the first sensing drive by the sensor device SD according to the present first embodiment. Here, an example of using a human finger as an input means is described.

As shown in FIG. 5, a detection circuit DC further comprises a control switch SW1 and a reset switch SW2. A capacitance $C_{HT}$ is the capacitance between the finger and a VCOM (system ground line). A capacitance $C_{HR}$ is the capacitance between the finger and the second electrode E2. A capacitance $C_1$ is the capacitance between the VCOM (system ground line) and the second electrode E2. A capacitance $C_{oft}$ is an offset adjustment capacitance. A capacitor $C_{fb}$ is a gain adjustment capacitance.

An operation amplifier AMP includes an inverting input terminal, a non-inverting input terminal, and an output terminal. The inverting input terminal is connected to the capacitor $C_{fb}$, and electrically connected to the capacitance $C_{HR}$, the capacitance $C_1$, and the capacitance $C_{oft}$ via the control switch SW1. The non-inverting input terminal is connected to a reference potential line, and a reference voltage $V_{ref}$ is given to the non-inverting input terminal. The capacitor $C_{fb}$ is connected to the output terminal. The reset switch SW2 is connected in parallel with the capacitor $C_{fb}$. The capacitance $C_{oft}$ is connected to the floating ground line, and an offset voltage $V_{oft}$ is given to the capacitance $C_{oft}$ from the floating ground line.

Here, the offset voltage $V_{oft}$ will be described.

The offset voltage $V_{oft}$ is generated in the detection circuit DC (Touch IC). When, in synchronization with the first synchronization signal Sy1 output from the first output unit OU1, the first synchronization signal Sy1 changes from Low level to High level (when the second synchronization signal Sy2 changes from High level to Low level), the offset voltage $V_{oft}$ changes from voltage $V_{oft2}$ (floating GND reference) to voltage $V_{oft1}$ (floating GND reference) as $V_{oft1} < V_{oft2}$. To the capacitance $C_{oft}$, $\Delta V = V_{ref} - V_{oft2}$ changes to $\Delta V = V_{ref} - V_{oft1}$.

In other words, a current flows as a +current from the control switch SW1 side of the capacitance $C_{oft}$ toward a terminal on the opposite side of the switch. In general, voltage $V_{oft1}$=FGND, the voltage $V_{oft2}$ is a supply voltage VDD, and, by varying the capacitance value of the capacitance $C_{oft}$, the amount of charge to be drawn is varied.

The on/off of the reset switch SW2 is synchronized with the first synchronization signal Sy1. By switching the reset switch SW2 to on, the charge of the capacitor $C_{fb}$ can be set to zero. Therefore, it is also possible to continue the accumulation of charge in the capacitor $C_{fb}$ until before switching the reset switch SW2 to on. The detector IN can output a voltage proportional to the amount of charge accumulated in the capacitor $C_{fb}$ as an output signal $V_{out}$. Note that, when driving, an analog front end (AFE) substrate, the power supply of the sensor, and the GND are set to floating. The output signal $V_{out}$ can be expressed by the following formula 1.

$$V_{out} = V_{ref} - \frac{C_1 + C_{HR}}{C_{fb}} \Delta V_{tx} + \frac{C_{oft}}{C_{fb}} \Delta V_{oft} \qquad \text{Formula 1}$$

Here, a voltage $V_{tx}$ is the amplified second synchronization signal Sy2α.

The offset voltage $V_{oft}$ has a polarity inverted from the polarity of the first synchronization signal Sy1. Therefore, in a case where a current I flows excessively in the capacitance $C_{oft}$, offset cancellation can be performed satisfactorily, which contributes to good detection of input information. Note that in a case where the offset voltage $V_{oft}$ has the same polarity as the polarity of the first synchronization signal Sy1, the offset voltage $V_{oft}$ will function oppositely, making it difficult to perform the offset cancellation operation and thus difficult to detect the input information satisfactorily.

Figure 6:
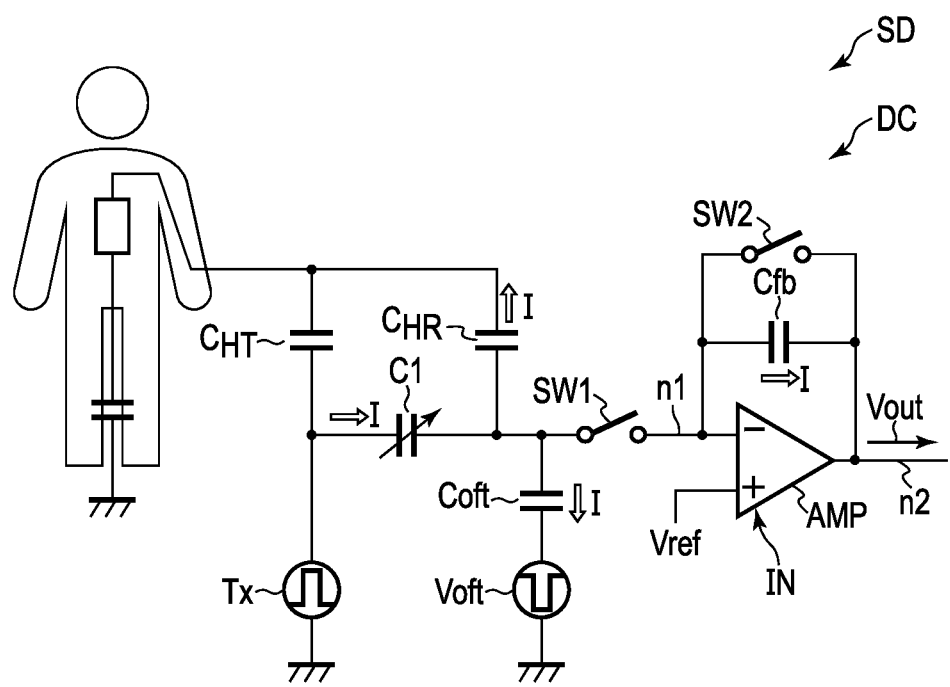
FIG. 6 is a circuit diagram for explaining a comparative example of the first sensing drive.

Next, a comparative example of the first sensing drive will be described. FIG. 6 is a circuit diagram for explaining the comparative example of the first sensing drive. Again, an example of using a human finger as the input means is described.

As shown in FIG. 6, the detection circuit DC further comprises the control switch SW1 and the reset switch SW2. The capacitance $C_{HT}$ is the capacitance between the finger and the first electrode E1. The capacitance $C_{HR}$ is the capacitance between the finger and the second electrode E2. The capacitance $C_1$ is the capacitance between the first electrode E1 and the second electrode E2. The capacitance $C_{oft}$ is an offset adjustment capacitance. The capacitor $C_{fb}$ is a gain adjustment capacitance.

Regardless of whether a finger is detected or not, the current I flowing through the capacitance $C_{oft}$ is constant. With the addition of the capacitance $C_{HT}$ and the capacitance $C_{HR}$, a capacitance $C_{mut}$ decreases.

Here, the capacitance $C_{mut}$ will be described.

The capacitance $C_{mut}$ is a cross-capacitance (C=εrS/d) between the first electrode E1 and the second electrode E. εr is a relative dielectric constant of an insulating material therebetween, S is an electrode area, and d is a distance between the first electrode E1 and the second electrode E2. The capacitance $C_{mut}$ is configured by a fringe capacitance and uses an electric field generated from electrode edges instead of so-called parallel plate electrodes.

The fringe capacitance of the capacitance $C_{mut}$ decreases as the finger approaches, due to fringe electric fields between the first electrode E1 and the finger, and between the second electrode E2 and the finger.

$$C_1 = C_{mut}$$

When there is no finger, $C_{HR} \approx 0$, $C_{HT} \approx 0$ are established;
when a finger is in contact, $C_{HR} > 0$, $C_{HT} > 0$ are established; and $C_{mut}$ (with finger)<$C_{mut}$ (without finger) is established.

The output signal $V_{out}$ output by the detector IN can be expressed by the following formula 2.

$$V_{out} = V_{ref} - \frac{C_1}{C_{fb}} \Delta V_{tx} + \frac{C_{off}}{C_{fb}} \Delta V_{off} \quad \text{Formula 2}$$

According to the sensor device SD of the first embodiment configured as described above, the sensor device SD is provided with the timing control circuit TI outside the second circuit CI2. The timing control circuit TI can newly generate a second synchronization signal Sy2 and change (invert) the phase of the second synchronization signal Sy2 according to the first sensing mode. The phase-inverted second synchronization signal Sy2 can be used to drive the floating ground line of the electrically isolated second circuit CI2, the first electrode E1, and the third electrode E3. Therefore, even without the FW correction, input by the finger can be detected satisfactorily by giving the second synchronization signal Sy2 to the floating ground line and performing ground line modulation. Then, the coordinates of the finger in the first direction d1 and the second direction d2, and the distance from the second electrode E2 to the finger in the third direction d3 can be detected, allowing a so-called hover detection to be performed. From the above, it is possible to obtain a sensor device SD capable of detecting input information.

The panel PNL has a third electrode E3. During the first sensing drive period, the second synchronization signal Sy2 is given to the third electrode E3. The third electrode E3 is capable of shielding an undesired electric field that may be formed between the second electrode E2 and an external object of the panel PNL. Therefore, it is possible to obtain a sensor device SD that can accurately detect input information.

Second Embodiment

Figure 7:
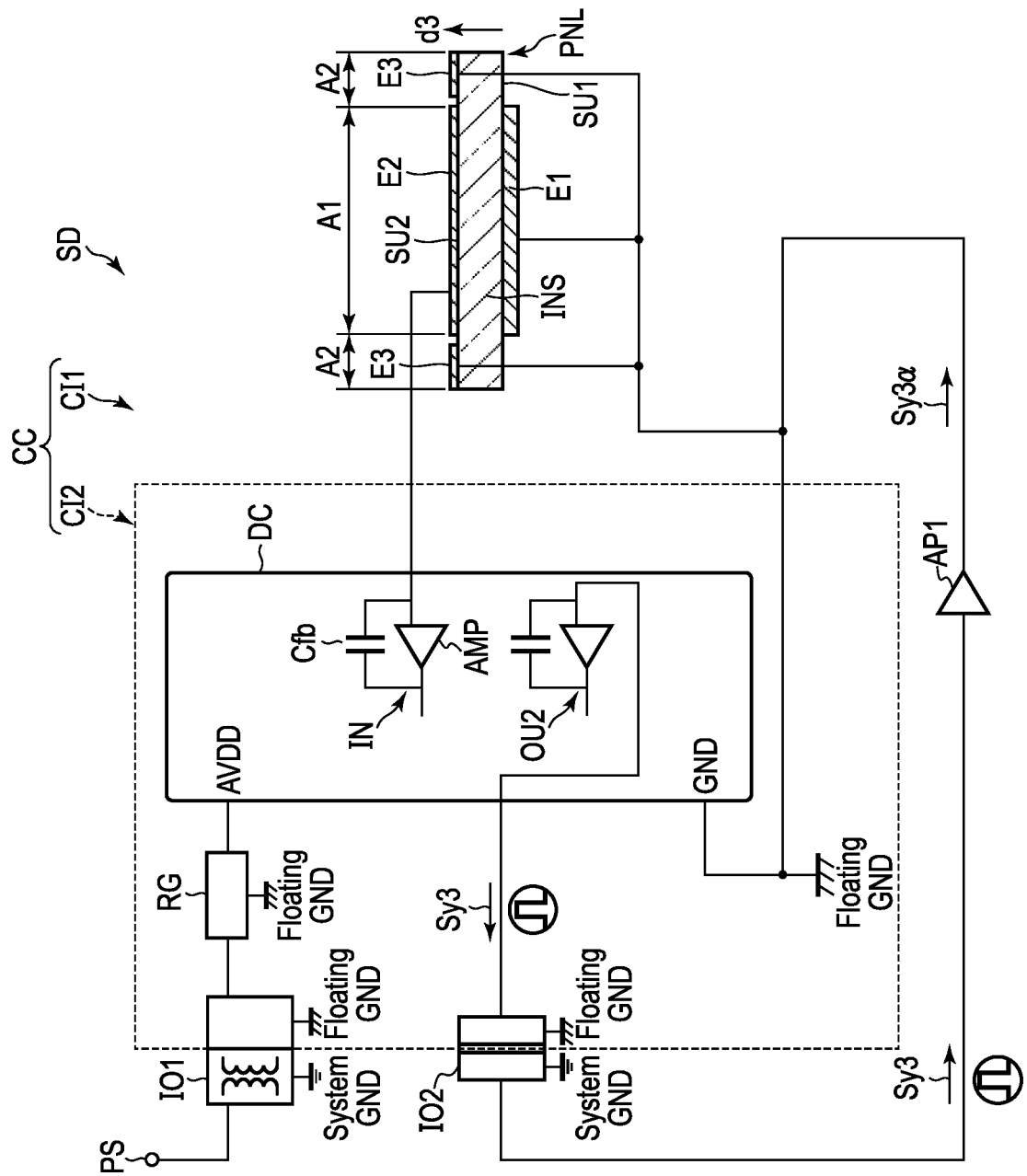
FIG. 7 is a circuit diagram showing a sensor device according to a second embodiment.

Next, a sensor device SD of a second embodiment will be described. FIG. 7 is a circuit diagram showing the sensor device SD of the second embodiment. In the present second embodiment, differences from the first embodiment above will be explained.

As shown in FIG. 7, in a panel PNL, a first electrode E1 functions as a shield electrode, a second electrode E2 functions as a detection electrode, and a third electrode E3 functions as a shield electrode. In the present second embodiment, the panel PNL may be configured without the third electrode E3.

A first circuit CI1 does not include a timing control circuit TI.

A detection circuit DC includes a second output unit OU2 instead of the first output unit OU1. The second output unit OU2 is configured in the same manner as a detector IN and is formed by an integrator. An inverting input terminal of the second output unit OU2 is connected to an isolator IO2. A first amplifier AP1 is connected to the second output unit OU2 via the isolator IO2.

Next, a second sensing drive in the present second embodiment will be described. A second sensing mode for the second sensing drive may be referred to as the self-capacitive sensing mode.

During a second sensing drive period, the second output unit OU2 outputs a third synchronization signal Sy3, and the third synchronization signal Sy3 is given to the first amplifier AP1 via the isolator IO2. The first amplifier AP1 amplifies the third synchronization signal Sy3, and gives an amplified third synchronization signal Sy3α to a floating ground line, the first electrode E1, and the third electrode E3, respectively. The detection circuit DC writes a write signal $V_{self}$ to the second electrode E2. Subsequently, the detector IN reads a sensor signal generated at the second electrode E2, which is the change in the write signal $V_{self}$.

According to the sensor device SD of the second embodiment configured as described above, the sensor device SD that can detect input information by the second sensing drive can be obtained. The timing of the second sensing drive can be controlled using the second output unit OU2 of the detection circuit DC. As a result, a sensor device SD that is capable of easily controlling the timing of the second sensing drive can be obtained. In addition, a circuit configuration for the timing control of the second sensing drive can be simplified.

When writing the write signal $V_{self}$ to the second electrode E2, the first electrode E1 and the third electrode E3 are driven in the same phase as the second electrode E2. In other words, the write signal $V_{self}$ given to the second electrode E2 and the amplified third synchronization signal Sy3α given to the first electrode E1 and the third electrode E3 are identical in phase and amplitude. Since a parasitic capacitance that can be formed between the second electrode E2 and the first electrode E1, and a parasitic capacitance that can be formed between the second electrode E2 and the third electrode E3 can be reduced, a sensor device SD that is capable of accurately detecting input information can be obtained.

Third Embodiment

Figure 8:
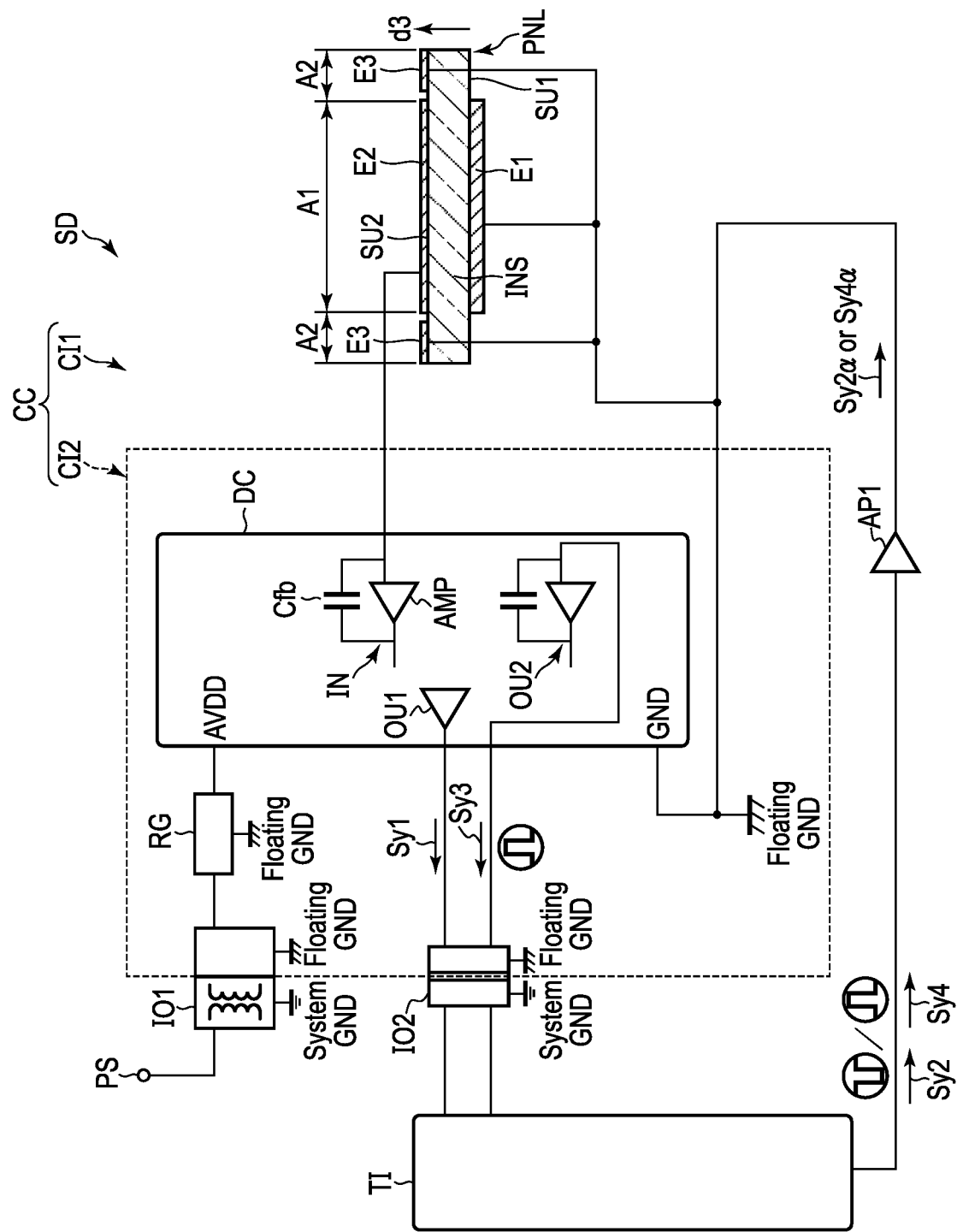
FIG. 8 is a circuit diagram showing a sensor device according to a third embodiment.

Next, a sensor device SD of a third embodiment will be described. FIG. 8 is a circuit diagram showing the sensor device SD of the third embodiment. In the present third embodiment, differences from the first embodiment and the second embodiment will be explained.

As shown in FIG. 8, the sensor device SD supports both a first sensing drive and a second sensing drive. During a first sensing drive period, a first electrode E1 functions as a sensor drive electrode, a second electrode E2 functions as a detection electrode, and a third electrode E3 functions as a shield electrode. On the other hand, during a second sensing drive period, the first electrode E1 functions as the shield electrode, the second electrode E2 functions as the detection electrode, and the third electrode E3 functions as the shield electrode. In the present third embodiment, a panel PNL may be configured without the third electrode E3.

A detection circuit DC includes both a first output unit OU1 and a second output unit OU2. During the first sensing drive period, the first output unit OU1 outputs a first synchronization signal Sy1, and the second output unit OU2 does not output a third synchronization signal Sy3. On the other hand, during the second sensing drive period, the second output unit OU2 outputs the third synchronization signal Sy3, and the first output unit OU1 does not output the first synchronization signal Sy1.

A first circuit CI1 includes a timing control circuit TI, and the timing control circuit TI is connected between an isolator IO2 and a first amplifier AP1.

Next, the first sensing drive in the present third embodiment will be described.

During the first sensing drive period, the first output unit OU1 outputs the first synchronization signal Sy1, and the first synchronization signal Sy1 is given to the timing control circuit TI via the isolator IO2. The timing control circuit TI outputs a second synchronization signal Sy2, which is generated based on the first synchronization signal Sy1 and has a polarity inverted from the polarity of the first synchronization signal Sy1. The second synchronization signal Sy2 is given to the first amplifier AP1. The first amplifier AP1 amplifies the second synchronization signal Sy2 and gives an amplified second synchronization signal Sy2a to each of a floating ground line, the first electrode E1, and the third electrode E3. Subsequently, a detector IN reads the change in a sensor signal generated at the second electrode E2.

Next, the second sensing drive in the present third embodiment will be described.

During the second sensing drive period, the second output unit OU2 outputs the third synchronization signal Sy3, and the third synchronization signal Sy3 is given to the timing control circuit TI via the isolator IO2. The timing control circuit TI outputs a fourth synchronization signal Sy4, which is generated based on the third synchronization signal Sy3 and has the same polarity as that of the third synchronization signal Sy3. The fourth synchronization signal Sy4 is given to the first amplifier AP1. The first amplifier AP1 amplifies the fourth synchronization signal Sy4 and gives an amplified fourth synchronization signal Sy4a to each of the floating ground line, the first electrode E1, and the third electrode E3. The detection circuit DC writes a write signal $V_{self}$ to the second electrode E2. Subsequently, the detector IN reads a sensor signal generated at the second electrode E2, which is the change in the write signal $V_{self}$.

Next, the second sensing drive according to the present third embodiment will be described in more detail. FIG. 9 is a circuit diagram for explaining the second sensing drive by the sensor device SD according to the present third embodiment. Here, an example of using a human finger as an input means is described.

As shown in FIG. 9, the detection circuit DC further comprises a control switch SW1 and a reset switch SW2. A capacitance $C_{HT}$ is the capacitance between the finger and a VCOM (system ground line). A capacitance $C_{HR}$ is the capacitance between the finger and the second electrode E2. A capacitance $C_1$ is the capacitance between VCOM (system ground line) and the second electrode E2. A capacitance $C_{oft}$ is an offset adjustment capacitance. A capacitor $C_{fb}$ is a gain adjustment capacitance.

The capacitor $C_{fb}$ is connected between an output terminal and an inverting input terminal of an operation amplifier AMP. The capacitance $C_{HR}$, the capacitance $C_1$, and the capacitance $C_{oft}$ are electrically connected to the inverting input terminal via the control switch SW1. A non-inverting input terminal is connected to a reference potential line, and the write signal $V_{self}$ is given to the non-inverting input terminal. The capacitance $C_{oft}$ is connected to the floating ground line, and an offset voltage $V_{oft}$ is given to the capacitance $C_{oft}$ from the floating ground line.

The on/off of the reset switch SW2 is synchronized with the first synchronization signal Sy1 or the third synchronization signal Sy3. By switching the reset switch SW2 to on, the detector IN outputs an output signal $V_{out}$. Note that, when driving, an AFE substrate, the power supply of a sensor, and GND are set to floating. The output signal $V_{out}$ can be expressed by the following formula 3.

Formula 3

$$V_{out} = V_{selfH} + V_{txH} + \frac{C_1 + C_{HR} + C_{oft}}{C_{fb}} \Delta V_{self} + \frac{C_1 + C_{HR}}{C_{fb}} \Delta V_{tx} - \frac{C_{oft}}{C_{fb}} \Delta V_{oft}$$

A drive voltage at the time of self drive is $V_{self} = V_{selfH} - V_{selfL}$. A voltage $V_{tx}$ is $V_{tx} = V_{txH} - V_{txL}$. Formula 3 is the formula when the voltage level of the self drive changes from $V_{selfL}$ to $V_{selfH}$.

When the voltage level of the self drive changes from $V_{selfH}$ to $V_{selfL}$, the formula changes and can be expressed by the following formula 4.

Formula 4

$$V_{out} = V_{selfL} + V_{txL} - \frac{C_1 + C_{HR} + C_{oft}}{C_{fb}} \Delta V_{self} - \frac{C_1 + C_{HR}}{C_{fb}} \Delta V_{tx} + \frac{C_{oft}}{C_{fb}} \Delta V_{oft}$$

The offset voltage $V_{oft}$ has the same polarity as that of the third synchronization signal Sy3. This is because the direction of a current I flowing through the capacitance $C_{oft}$ is reversed in the second sensing drive compared to the first sensing drive. Therefore, offset cancellation via the capacitance $C_{oft}$ can be performed satisfactorily, which contributes to good detection of input information.

Next, a comparative example of the above second sensing drive will be described. FIG. 10 is a circuit diagram for explaining the comparative example of the above second sensing drive. Again, an example of using a human finger as the input means is described.

As shown in FIG. 10, the detection circuit DC further includes the control switch SW1 and the reset switch SW2. The capacitance $C_{HT}$ is the capacitance between the finger and the VCOM (system ground line). The capacitance $C_{HR}$ is the capacitance between the finger and the second electrode E2. The capacitance $C_1$ is the capacitance between the VCOM (system ground line) and the second electrode E2. The capacitance $C_{oft}$ is an offset adjustment capacitance. The capacitor $C_{fb}$ is the gain adjustment capacitance. The output signal $V_{out}$ output by the detector IN can be expressed by the following formula 5.

Formula 5

$$V_{out} = V_{selfH} + \frac{C_1 + C_{HR} + C_{oft}}{C_{fb}} \Delta V_{self} - \frac{C_{oft}}{C_{fb}} \Delta V_{oft}$$

According to the sensor device SD of the third embodiment configured as described above, the detection circuit DC includes both the first output unit OU1 and the second output unit OU2. The first circuit CI1 includes a timing control circuit TI. The timing control circuit TI can output the second synchronization signal Sy2 with the phase (polarity) inverted, or the fourth synchronization signal Sy4 with the phase (polarity) not inverted, according to the sensing mode. It is possible to obtain a sensor device SD capable of detecting input information with the first sensing drive and detecting input information with the second sensing drive. In addition, the present third embodiment can have the same effects as the first embodiment and the second embodiment above.

Fourth Embodiment

Next, a sensor device SD according to a fourth embodiment will be explained. FIG. 11 is a circuit diagram showing the sensor device SD according to the present fourth embodiment. In the present fourth embodiment, differences from the first embodiment above will be explained.

As shown in FIG. 11, in the present fourth embodiment, a third electrode E3 is an essential configuration for a panel PNL. A first circuit CI1 further includes a second amplifier AP2. A first amplifier AP1 and the second amplifier AP2 are connected to a timing control circuit TI at one end. In the present fourth embodiment, an input terminal of the first amplifier AP1 and an input terminal of the second amplifier AP2 are electrically connected. The first amplifier AP1 is connected to a floating ground line and a first electrode E1 at the other end. The second amplifier AP2 is connected to all third electrodes E3 at the other end.

Next, a first sensing drive in the present fourth embodiment will be described.

During a first sensing drive period, a first output unit OU1 outputs a first synchronization signal Sy1, and the first synchronization signal Sy1 is given to the timing control circuit TI via an isolator IO2. The timing control circuit TI outputs a second synchronization signal Sy2, which is generated based on the first synchronization signal Sy1 and has a polarity inverted from the polarity of the first synchronization signal Sy1. The second synchronization signal Sy2 is given to the first amplifier AP1 and the second amplifier AP2, respectively. The first amplifier AP1 amplifies the second synchronization signal Sy2, and an amplified second synchronization signal Sy2α is given to each of the floating ground line and the first electrode E1. At that time, the second amplifier AP2 amplifies the second synchronization signal Sy2 and gives an amplified second synchronization signal Sy2β to the third electrode E3. Subsequently, a detector IN reads the change in a sensor signal generated at the second electrode E2.

Here, the amplitude of the second synchronization signal Sy2β amplified by the second amplifier AP2 is larger than the amplitude of the second synchronization signal Sy2α amplified by the first amplifier AP1 (amplitude of second synchronization signal Sy2α<amplitude of second synchronization signal Sy2β).

According to the sensor device SD of the fourth embodiment configured as described above, the first amplifier AP1 for driving the floating ground line and the first electrode E1, and the second amplifier AP2 for driving the third electrode E3 can be separated. By making the amplitude of the second synchronization signal Sy2β larger than the amplitude of the second synchronization signal Sy2α, the potential of the third electrode E3 can be made higher than that of the first electrode E1. As a result, compared with the first embodiment above, a shielding effect of the third electrode E3 can be enhanced, and a sensor device SD capable of detecting input information with even higher accuracy can be obtained. In addition, the present fourth embodiment can have the same effects as the first embodiment above.

Fifth Embodiment

Figure 13:
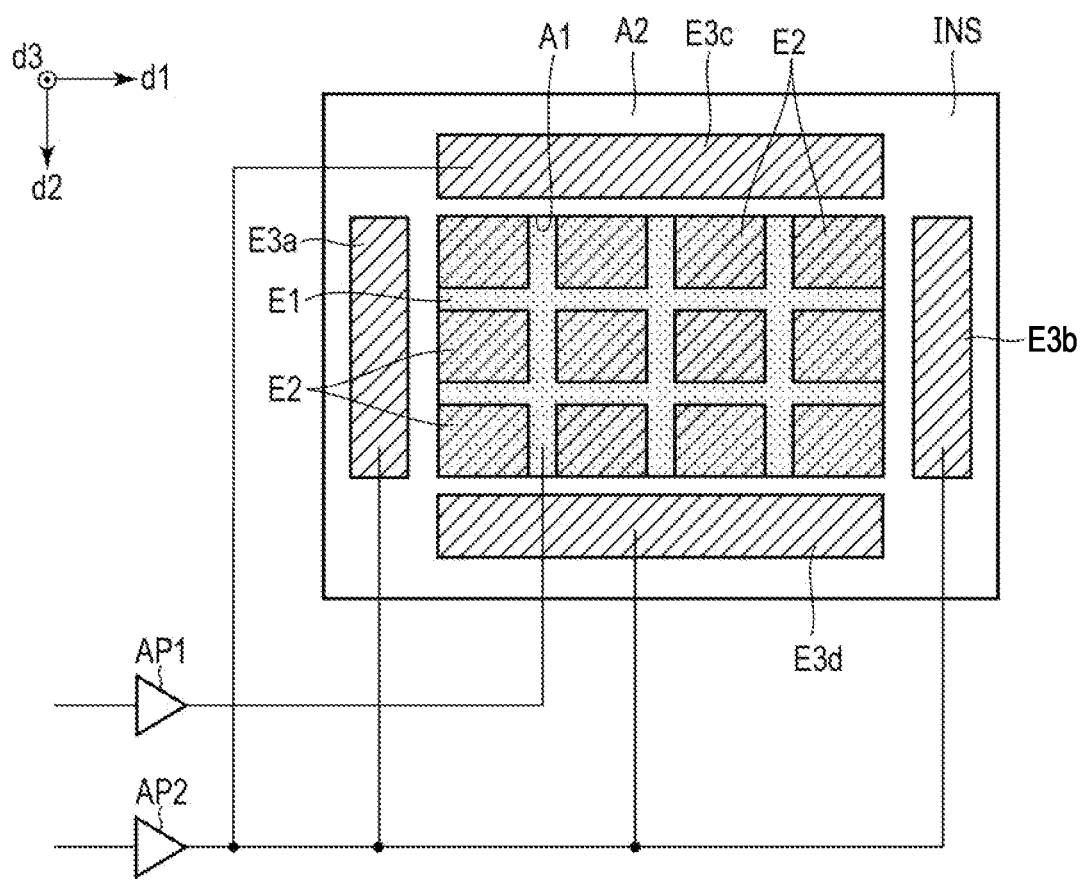
FIG. 13 is a plan view of a panel shown in FIG. 12.

Next, a sensor device SD according to a fifth embodiment will be described. FIG. 12 is a circuit diagram of the sensor device SD according to the present fifth embodiment. FIG. 13 is a plan view of a panel PNL shown in FIG. 12. In FIG. 13, a first electrode E1 is shown by a dotted pattern, and a second electrode E2 and a third electrode E3 are shown by diagonal lines. In the present fifth embodiment, differences from the fourth embodiment above will be explained.

As shown in FIG. 12 and FIG. 13, an input terminal of a first amplifier AP1 and an input terminal of a second amplifier AP2 are electrically and independently connected to a timing control circuit TI. An output terminal of the first amplifier AP1 is connected to a floating ground line and the first electrode E1. An output terminal of the second amplifier AP2 is connected to all the third electrodes E3.

Next, a first sensing drive in the present fifth embodiment will be described.

During a first sensing drive period, a first output unit OU1 outputs a first synchronization signal Sy1, and the first synchronization signal Sy1 is given to the timing control circuit TI via an isolator IO2. The timing control circuit TI outputs a second synchronization signal Sy2, which is generated based on the first synchronization signal Sy1 and has a polarity inverted from the polarity of the first synchronization signal Sy1. The second synchronization signal Sy2 is given to the first amplifier AP1. On the other hand, the timing control circuit TI outputs a fifth synchronization signal Sy5, which is generated based on the first synchronization signal Sy1 and has a polarity inverted from the polarity of the first synchronization signal Sy1. The fifth synchronization signal Sy5 is given to the second amplifier AP2.

The first amplifier AP1 amplifies the second synchronization signal Sy2, and an amplified second synchronization signal Sy2α is given to each of the floating ground line and the first electrode E1. At that time, the second amplifier AP2 amplifies the fifth synchronization signal Sy5, and an amplified fifth synchronization signal Sy5α is given to the third electrode E3. Subsequently, a detector IN reads the change in a sensor signal generated at the second electrode E2.

Here, the amplitude of the fifth synchronization signal Sy5α amplified by the second amplifier AP2 is larger than the amplitude of the second synchronization signal Sy2α amplified by the first amplifier AP1 (amplitude of second synchronization signal Sy2α<amplitude of fifth synchronization signal Sy5α).

In the fifth embodiment configured as described above, the same effect as in the fourth embodiment above can be obtained.

Modified Example 1 of Fifth Embodiment

Next, a sensor device SD according to a modified example 1 of the above fifth embodiment will be described.

As shown in FIG. 12, the sensor device SD may be used to perform a second sensing drive. During a second sensing drive period, a detection circuit DC writes a write signal $V_{self}$ to the second electrode E2. At that time, the floating ground line and the first electrode E1 are driven by the second synchronization signal Sy2α having the same phase as the write signal $V_{self}$, and the third electrode E3 is driven by the fifth synchronization signal Sy5α having the same phase as the write signal $V_{self}$. From the above, the sensor device SD of the present modified example 1 can realize the second sensing drive as in the second embodiment above.

The amplitude of the fifth synchronization signal Sy5α may be the same as the amplitude of the second synchronization signal Sy2α. However, the amplitude of the fifth synchronization signal Sy5α is preferable to be larger than the amplitude of the second synchronization signal Sy2α. This is because, as mentioned above, the shielding effect of the third electrode E3 can be enhanced.

Modified Example 2 of Fifth Embodiment

Next, a sensor device SD according to a modified example 2 of the above fifth embodiment will be described.

As shown in FIG. 12, the sensor device SD is configured to perform the first sensing drive. During the first sensing drive period, the first electrode E1 functions as a shield electrode, the second electrode E2 functions as a detection electrode, and the third electrode E3 functions as a sensor drive electrode.

The first amplifier AP1 is configured to provide a constant voltage to the floating ground line and the first electrode E1 instead of the second synchronous signal Sy2α. The floating ground line and the first electrode E1 are set to a fixed potential which is, for example, the same potential as the system ground (system GND). The second amplifier AP2 gives the fifth synchronization signal Sy5α to the third electrode E3. Subsequently, the detector IN reads the change in a sensor signal generated at the second electrode E2.

This allows detection to be performed based on the change in an electric field formed between the second electrode E2 and the third electrode E3, and can be used for a so-called gesture detection. For example, the movement of a palm (input means) above the second electrode E2 can be detected. In the present modified example 2, the sensor drive electrode is the third electrode E3. The distance (range) in a third direction d3 from the second electrode E2, in which the input means can be detected, is longer (wider) in the gesture detection than in a hover detection where the sensor drive electrode is the first electrode E1.

As described above, the gesture detection has a feature that the detectable distance is longer than the hover detection. On the other hand, the hover detection has a feature that it can detect coordinates in a first direction d1 and a second direction d2 in more detail than the gesture detection.

When the gesture detection is performed in the first sensing drive, it is not necessary to set the floating ground line and the first electrode E1 to a fixed potential as described above. For example, the third electrode E3 may be driven by setting the phase of the fifth synchronization signal Sy5α to the opposite of the phase of the second synchronization signal Sy2α.

Sixth Embodiment

Figure 14:
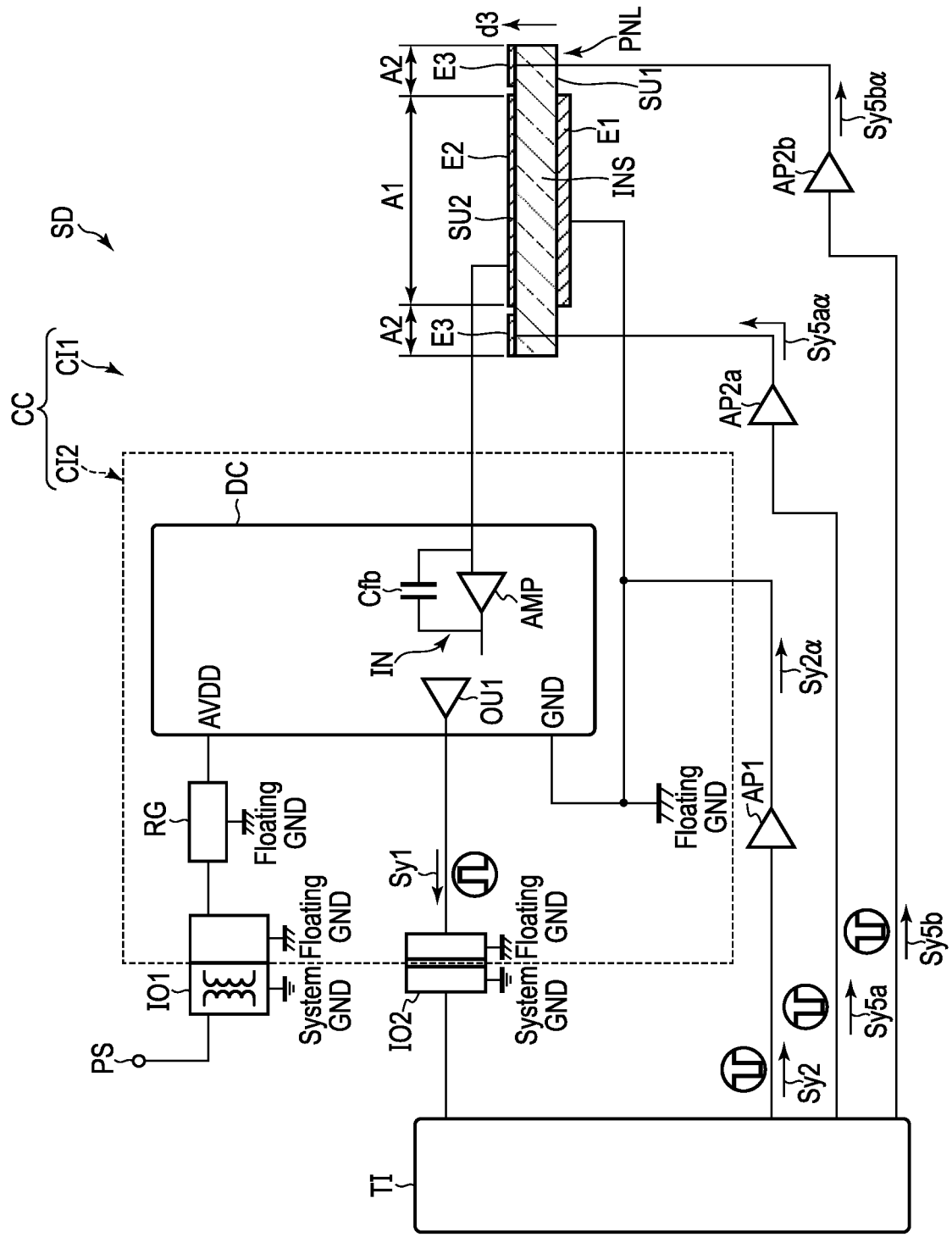
FIG. 14 is a circuit diagram showing a sensor device according to a sixth embodiment.
Figure 15:
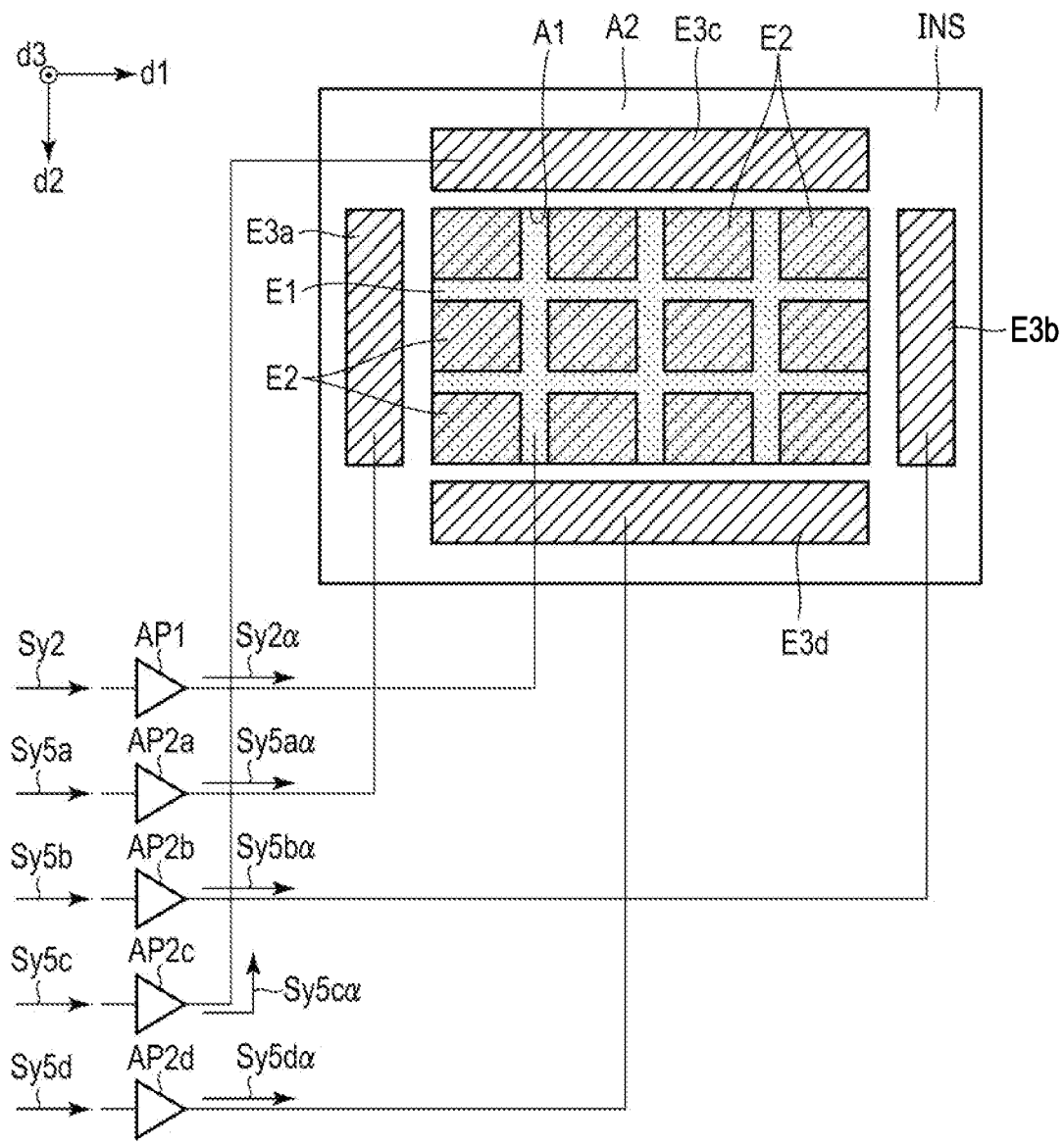
FIG. 15 is a plan view of a panel shown in FIG. 14.

Next, a sensor device SD according to a sixth embodiment will be described. FIG. 14 is a circuit diagram of the sensor device SD according to the sixth embodiment. FIG. 15 is a plan view of a panel PNL shown in FIG. 14. In FIG. 15, a first electrode E1 is shown by a dotted pattern, and a second electrode E2 and a third electrode E3 are shown by diagonal lines. In the present sixth embodiment, differences from the fourth embodiment above will be described.

As shown in FIG. 14 and FIG. 15, an output terminal of a first amplifier AP1 is connected to a floating ground line and the first electrode E1.

A first circuit CI1 includes a plurality of second amplifiers AP2. An input terminal of the first amplifier AP1 and input terminals of the plurality of second amplifiers AP2 are electrically and independently connected to a timing control circuit TI. The plurality of second amplifiers AP2 are electrically connected to a plurality of third electrodes E3 on a one-to-one basis. The plurality of second amplifiers AP2 include a second amplifier AP2a, a second amplifier AP2b, a second amplifier AP2c, and a second amplifier AP2d. An output terminal of the second amplifier AP2a is connected to a third electrode E3a. An output terminal of the second amplifier AP2b is connected to a third electrode E3b. An output terminal of the second amplifier AP2c is connected to a third electrode E3c. An output terminal of the second amplifier AP2d is connected to a third electrode E3d. A control circuit CC is configured to drive the third electrode E3a, the third electrode E3b, the third electrode E3c, and the third electrode E3d independently.

Next, a first sensing drive in the present sixth embodiment will be described.

During a first sensing drive period, a first output unit OU1 outputs a first synchronization signal Sy1, and the first synchronization signal Sy1 is given to the timing control circuit TI via an isolator IO2. The timing control circuit TI outputs a second synchronization signal Sy2, which is generated based on the first synchronization signal Sy1 and has a polarity inverted from the polarity of the first synchronization signal Sy1. The second synchronization signal Sy2 is given to the first amplifier AP1.

On the other hand, the timing control circuit TI outputs a plurality of fifth synchronization signals Sy5, which are generated based on the first synchronization signal Sy1 and have a polarity inverted from the polarity of the first synchronization signal Sy1. A fifth synchronization signal Sy5a is given to the second amplifier AP2a, a fifth synchronization signal Sy5b is given to the second amplifier AP2b, a fifth synchronization signal Sy5c is given to the second amplifier AP2c, and a fifth synchronization signal Sy5d is given to the second amplifier AP2d.

The first amplifier AP1 amplifies the second synchronization signal Sy2 and gives an amplified second synchronization signal Sy2α to each of the floating ground line and the first electrode E1. At that time, each of the second amplifiers AP2 amplifies a corresponding fifth synchronization signal Sy5 and gives the amplified fifth synchronization signal to a corresponding third electrode E3. The second amplifier AP2a amplifies the fifth synchronization signal Sy5a and gives an amplified fifth synchronization signal Sy5aα to the third electrode E3a. The second amplifier AP2b amplifies the fifth synchronization signal Sy5b and gives an amplified fifth synchronization signal Sy5bα to the third electrode E3b. The second amplifier AP2c amplifies the fifth synchronization signal Sy5c and gives an amplified fifth synchronization signal Sy5cα to the third electrode E3c. The second amplifier AP2d amplifies the fifth synchronization signal Sy5d and gives an amplified fifth synchronization signal Sy5dα to the third electrode E3d. Subsequently, a detector IN reads the change in a sensor signal generated at the second electrode E2.

Here, the amplitude of the fifth synchronization signals Sy5aα, Sy5bα, Sy5cα, and Sy5dα amplified by the respective second amplifiers AP2 are larger than the amplitude of the second synchronization signal Sy2α.

The sixth embodiment configured as described above also has the same effect as the fourth embodiment.

Modified Example 1 of Sixth Embodiment

Next, a sensor device SD according to a modified example 1 of the above sixth embodiment will be described.

As shown in FIG. 14, the sensor device SD may be used to perform a second sensing drive. During a second sensing drive period, a detection circuit DC writes a write signal $V_{self}$ to the second electrode E2. At that time, the floating ground line and the first electrode E1 are driven by the second synchronization signal Sy2α having the same phase as the write signal $V_{self}$, and the third electrodes E3 are driven by the fifth synchronization signals Sy5aα, Sy5bα, Sy5cα, and Sy5dα having the same phase as the write signal $V_{self}$. From the above, the sensor device SD of the present modified example 1 can realize the second sensing drive as in the second embodiment above.

The amplitude of each of the fifth synchronization signals Sy5aα, Sy5bα, Sy5cα, and Sy5dα may be the same as the amplitude of the second synchronization signal Sy2α. However, amplitude of each of the fifth synchronization signals Sy5aα, Sy5bα, Sy5cα, and Sy5dα is preferable to be larger than the amplitude of the second synchronization signal Sy2a.

Modified Example 2 of Sixth Embodiment

Next, a sensor device SD according to a modified example 2 of the present sixth embodiment will be described.

As shown in FIG. 14, the sensor device SD is configured to perform the first sensing drive. During the first sensing drive period, the first electrode E1 functions as a shield electrode, and the second electrode E2 functions as a detection electrode. The third electrodes E3a, E3b, E3c, and E3d function as sensor drive electrodes in order, and the remaining third electrodes that do not function as sensor drive electrodes function as shield electrodes. For example, during a period where the third electrode E3a functions as the sensor drive electrode, the remaining third electrodes E3b, E3c, and E3d function as shield electrodes.

The first amplifier AP1 is configured to provide a constant voltage to the floating ground line and the first electrode E1 instead of the second synchronous signal Sy2α. The floating ground line and the first electrode E1 are set to a fixed potential which is, for example, the same potential as the system ground (system GND).

The second amplifiers AP2a, AP2b, AP2c, and AP2d provide a constant voltage to the third electrodes E3 functioning as shield electrodes, and set the third electrodes E3 functioning as the shield electrodes to a fixed potential (e.g., the same potential as the system ground). On the other hand, the second amplifiers AP2a, AP2b, AP2c, and AP2d provide a fifth synchronization signal to the third electrode E3 functioning as the sensor drive electrode.

Subsequently, the detector IN reads the change in a sensor signal generated at each of the second electrode E2.

This allows detection to be performed based on the change in an electric field formed between the second electrode E2 and the third electrode E3, and can be used for the gesture detection and the hover detection. Compared to the fifth embodiment described above, the position and height of the input means can be detected in more detail. This is because the third electrodes E3a, E3b, E3c, and E3d are not made to function as the sensor drive electrodes at the same time, however, can be made to function as the sensor drive electrodes in turn.

Next, an example of the first sensing drive in the present modified example 2 will be described.

FIG. 16 is a diagram for explaining the first sensing drive by the sensor device SD according to the present modified example 2, and is a cross-sectional view showing the panel PNL. FIG. 16 corresponds to the operation of the sensor device SD in a case where the third electrode E3a functions as the sensor drive electrode, and the remaining third electrodes E3b, E3c, and E3d function as shield electrodes.

FIG. 17 is another diagram for explaining the first sensing drive by the sensor device SD of the present modified example 2, and is a cross-sectional view showing the panel PNL. FIG. 17 corresponds to the operation of the sensor device SD in a case where the third electrode E3b functions as the sensor drive electrode, and the remaining third electrodes E3a, E3c, and E3d function as shield electrodes.

In FIG. 16 and FIG. 17, the input means at a first position P1 is shown in a solid line, and the input means at a second position P2 is shown in a dashed line.

Figure 18:
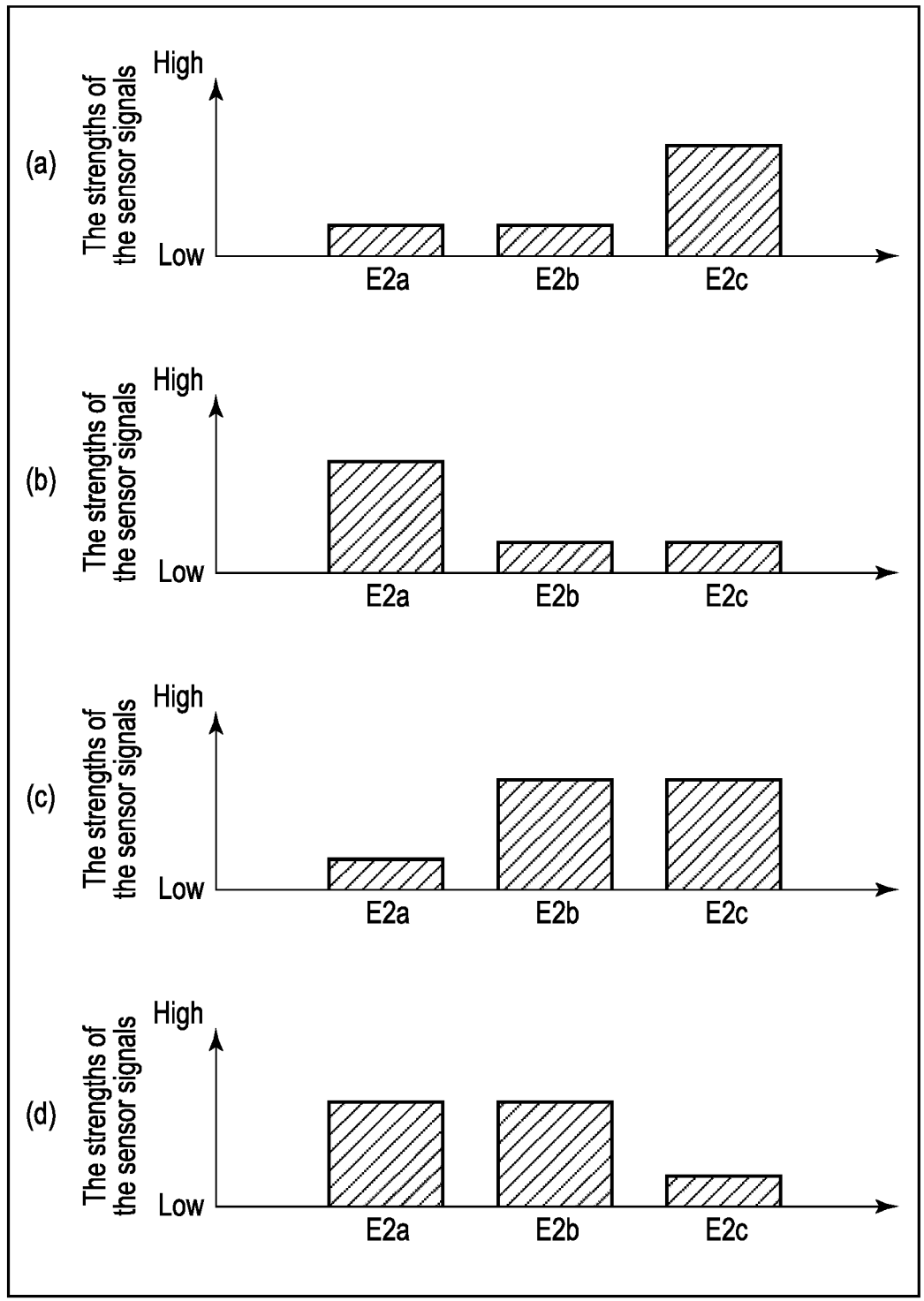
FIG. 18 shows a graph of the change in a sensor signal with respect to the position of the panel and the position of input means according to the modified example 2 of the sixth embodiment.

FIG. 18 shows a graph of the change in the sensor signal with respect to the position of the panel PNL and the position of the input means according to the present modified example 2. In the present modified example 2, a case in which three second electrodes E2 of the second electrode E2a, the second electrode E2b, and the second electrode E2c are lined up in the first direction d1 between the third electrode E3a and the third electrode E3b is described.

FIG. 18(a) shows changes in each of the sensor signals generated at the second electrodes E2a, E2b, and E2c in a case where an input means at the first position P1 is detected in a period where the panel PNL is driven in the manner shown in FIG. 16.

FIG. 18(b) shows changes in each of the sensor signals generated at the second electrodes E2a, E2b, and E2c in a case where an input means at the first position P1 is detected in a period where the panel PNL is driven in the manner shown in FIG. 17.

FIG. 18(c) shows changes in each of the sensor signals generated at the second electrodes E2a, E2b, and E2c in a case where an input means at the second position P2 is detected in a period where the panel PNL is driven in the manner shown in FIG. 16.

FIG. 18(d) shows changes in each of the sensor signals generated at the second electrodes E2a, E2b, and E2c in a case where an input means at the second position P2 is detected in a period where the panel PNL is driven in the manner shown in FIG. 17.

First, a first sensing drive that detects the input means at the first position P1 will be described.

As shown in FIG. 16 and FIG. 18(a), it can be seen that it is difficult for the input means at the first position P1 to block an electric field formed between the third electrode E3a and the second electrode E2a and an electric field formed between the third electrode E3a and the second electrode E2b; however, it is easy for the input means at the first position P1 to block an electric field formed between the third electrode E3a and the second electrode E2c. It can also be seen that the strengths of the sensor signals of the second electrodes E2a and E2b are substantially the same, and are lower than the strength of the sensor signal of the second electrode E2c.

As shown in FIG. 17 and FIG. 18(b), it can be seen that it is difficult for the input means at the first position P1 to block an electric field formed between the third electrode E3b and the second electrode E2c and an electric field formed between the third electrode E3b and the second electrode E2b; however, it is easy for the input means at the first position P1 to block an electric field formed between the third electrode E3b and the second electrode E2a. It can also be seen that the strengths of the sensor signals of the second electrodes E2b and E2c are substantially the same, and are lower than the strength of the sensor signal of the second electrode E2a.

This means that, based on both data in FIG. 18(a) and FIG. 18(b), the input means of the first position P1 is located above the second electrode E2a and at a higher position (a position separated from the second electrode E2b in the third direction d3).

Since the relationship between a position between the input means and the third electrode E3a and a position between the input means and the second electrode E2 changes, it becomes possible to analyze information relating to the position and height of the input means.

Next, the first sensing drive that detects the input means at the second position P2 will be described.

As shown in FIG. 16 and FIG. 18(c), it can be seen that it is difficult for the input means at the second position P2 to block an electric field formed between the third electrode E3a and the second electrode E2a; however, it is easy for the input means at the second position P2 to block an electric field formed between the third electrode E3a and the second electrode E2b and an electric field formed between the third electrode E3a and the second electrode E2c. It can also be seen that the strengths of the sensor signals of the second electrodes E2b and E2c are substantially the same, and that the strength of the sensor signal of the second electrode E2a is lower than the strength of each of the sensor signals of the second electrodes E2b and E2c.

As shown in FIG. 17 and FIG. 18(d), it can be seen that it is difficult for the input means at the second position P2 to block an electric field formed between the third electrode E3b and the second electrode E2c; however, it is easy for the input means at the second position P2 to block an electric field formed between the third electrode E3b and the second electrode E2b and an electric field formed between the third electrode E3b and the second electrode E2a. It can also be seen that the strengths of the sensor signals of the second electrodes E2a and E2b are substantially the same, and that the strength of the sensor signal of the second electrode E2c is lower than the strength of each of the sensor signals of the second electrodes E2a and E2b.

This means that, based on both data in FIG. 18(c) and FIG. 18(d), it can be seen that the input means at the second position P2 is located above the second electrode E2a and at a lower position (on the second electrode E2b side than the first position P1).

Note that, when performing the first sensing drive in the present modified example 2, it is not necessary to set the floating ground line, the first electrode E1, and the third electrodes E3 functioning as the shield electrode as described above to a fixed potential. For example, in the example of FIG. 16, the third electrodes E3 may be driven by setting the phase of the fifth synchronization signal Sy5aα to the opposite of the phases of the second synchronization signal Sy2α and the fifth synchronization signals Sy5bα, Sy5cα, and Sy5dα.

Seventh Embodiment

Figure 19:
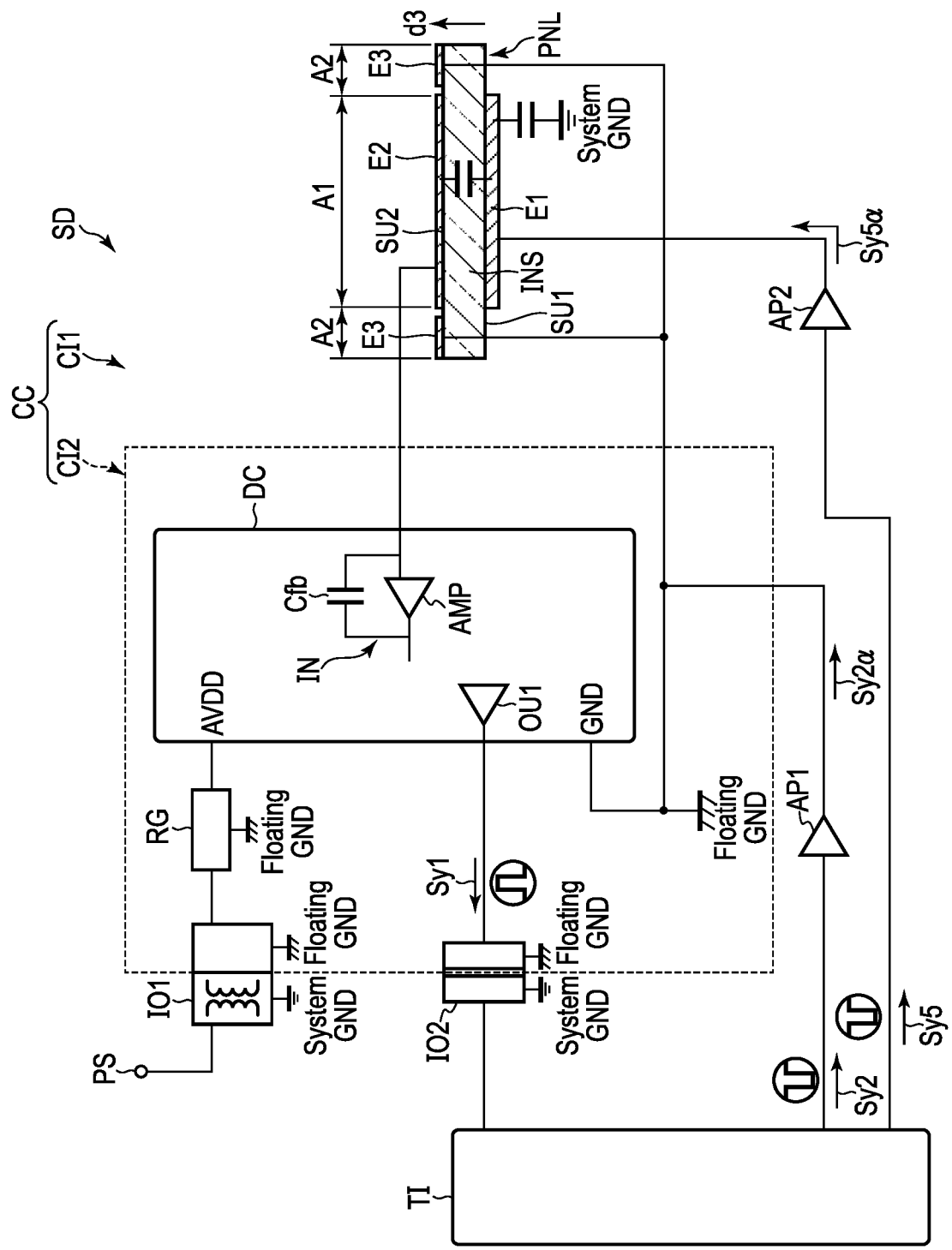
FIG. 19 is a circuit diagram showing a sensor device according to a seventh embodiment.

Next, a sensor device SD according to a seventh embodiment will be described. FIG. 19 is a circuit diagram showing the sensor device SD according to the present seventh embodiment. In the present seventh embodiment, differences from the above fifth embodiment will be explained.

As shown in FIG. 19, an output terminal of a first amplifier AP1 is connected to a floating ground line and all third electrodes E3. An output terminal of a second amplifier AP2 is connected to a first electrode E1.

Next, a first sensing drive in the present seventh embodiment will be described.

During a first sensing drive period, a first output unit OU1 outputs a first synchronization signal Sy1, and the first synchronization signal Sy1 is given to a timing control circuit TI via an isolator IO2. The timing control circuit TI outputs a second synchronization signal Sy2, which is generated based on the first synchronization signal Sy1 and has a polarity inverted from the polarity of the first synchronization signal Sy1. The second synchronization signal Sy2 is given to the first amplifier AP1. On the other hand, the timing control circuit TI outputs a fifth synchronization signal Sy5, which is generated based on the first synchronization signal Sy1 and has the same polarity as the polarity of the first synchronization signal Sy1. The fifth synchronization signal Sy5 is given to the second amplifier AP2.

The first amplifier AP1 amplifies the second synchronization signal Sy2, and an amplified second synchronization signal Sy2α is given to each of the floating ground line and the third electrodes E3. At that time, the second amplifier AP2 amplifies the fifth synchronization signal Sy5, and an amplified fifth synchronization signal Sy5α is given to the first electrode E1. Subsequently, a detector IN reads the change in a sensor signal generated at a second electrode E2.

Next, the first sensing drive according to the present seventh embodiment will be described in more detail. FIG. 20 is a circuit diagram for explaining the first sensing drive by the sensor device SD according to the present seventh embodiment. FIG. 20 shows an electrically connected relationship between a human H, a panel PNL, and a substrate (e.g., PCB) BD containing a control circuit CC. Here, an input means is a hand (e.g., a finger) of the human H.

As shown in FIG. 20, in the drawing, symbol C indicates a capacitance, symbol R indicates a resistance, and symbol Z indicates an impedance between a system ground line and earth. A capacitance C3 is a total capacitance of the substrate BD. A capacitance C2 is a capacitance between the second electrode E2 and the first electrode E1. A capacitance C4 is a capacitance between the first electrode E1 and the system ground line. A charge amount Q1 is the product of a capacitance C1 and a voltage V1 (Q1=C1·V1), and is the amount of charge between the human H and the sensor (panel PNL). Symbol V2 is an electromotive force of the substrate BD.

The first amplifier AP1, which drives the third electrode E3, etc., and the second amplifier AP2, which drives the first electrode E1, are present in the control circuit CC. The second amplifier AP2 operates so as to reduce the charge/discharge current of the capacitance C4. Since the fluctuation of the potential of the system ground line becomes smaller, it is possible to suppress a decrease in the charge/discharge charge amount of the capacitance C1.

Figure 21:
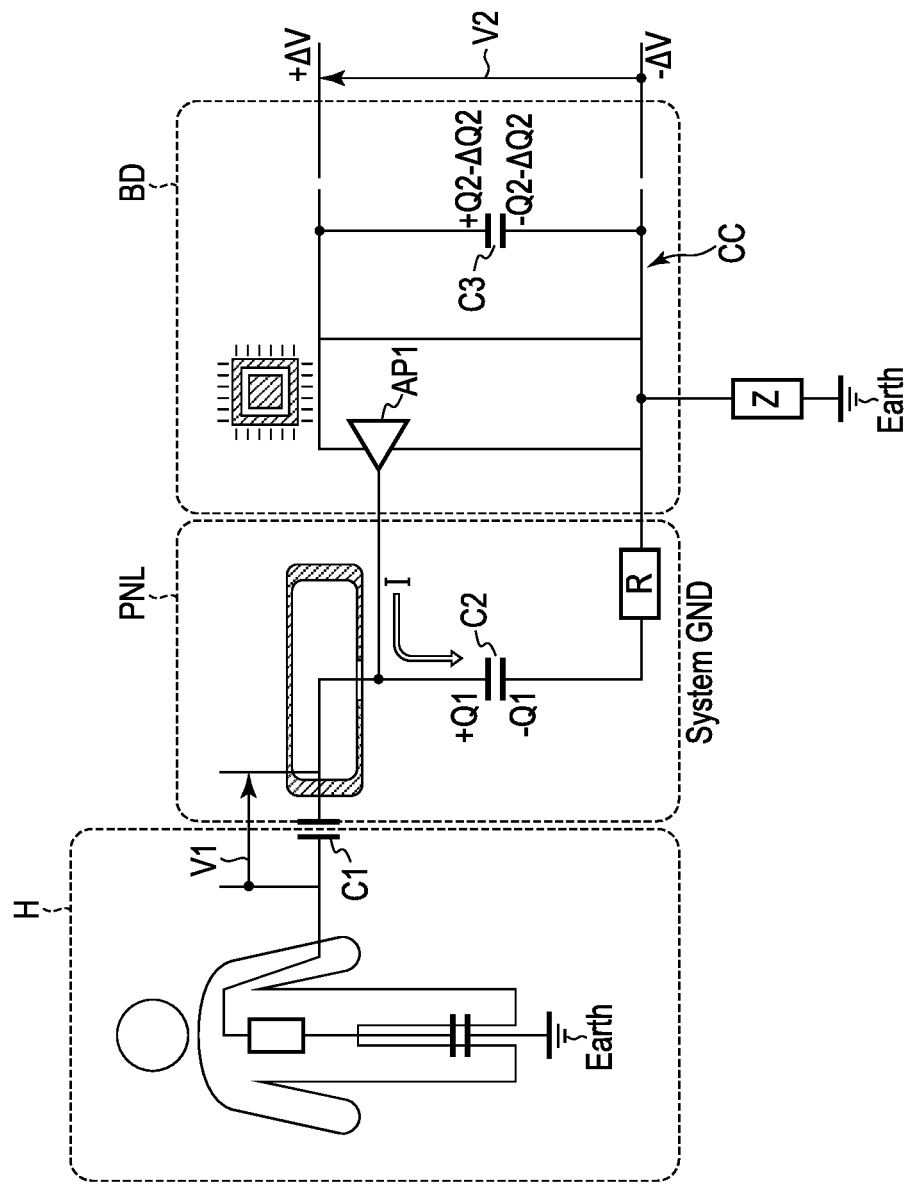
FIG. 21 is a circuit diagram for explaining a comparative example of the first sensing drive shown in FIG. 20.

Next, a comparative example of the above first sensing drive will be described. FIG. 21 is a circuit diagram for explaining the comparative example of the above first sensing drive shown in FIG. 20.

As shown in FIG. 21, in a case where the system ground line and earth are at the same potential, Z=0 and V1=V2 are obtained.

On the other hand, in a case where the potential of the system ground line is different from the potential of earth, Z≠0 is obtained, and the charge is supplied from the capacitance C3 in accordance with the charge/discharge of the sensor (panel PNL).

A change in the potential of the system ground line occurs in accordance with the impedance Z.

The potential change of the system ground line is determined according to the amount of current flowing through the capacitance C2 and the impedance Z.

Therefore, the charge/discharge charge amount of the capacitance C1 becomes smaller than C1·V2 because the potential of the system ground line is lowered.

In the seventh embodiment configured as described above, the same effect as in the modification example 2 of the fifth embodiment above can be obtained. The drive waveform of the first amplifier AP1 and the drive waveform of the second amplifier AP2 have opposite phases. Since the current direction of charging/discharging between the second electrode E2 and the first electrode E1 is opposite to the current direction of charging/discharging between the first electrode E1 and the system ground (system GND), the change in the voltage of the system ground line becomes smaller.

Eighth Embodiment

Next, a sensor device SD according to an eighth embodiment will be described. FIG. 22 is a circuit diagram showing the sensor device SD according to the eighth embodiment. In the present eighth embodiment, differences from the first embodiment above will be explained.

As shown in FIG. 22, in a panel PNL, a first electrode E1 functions as a sensor drive electrode, a second electrode E2 functions as a detection electrode, and third electrodes E3 function as shield electrodes. In the present eighth embodiment, the panel PNL may be configured without the third electrode E3.

A detection circuit DC further comprises a detection timing circuit DT. The detection timing circuit DT is connected between an isolator IO2 and a reset switch SW2. In the embodiment described above, a synchronization signal is given from the detection circuit DC to a timing control circuit TI via the isolator IO2. However, in the present eighth embodiment, the synchronization signal is given from the timing control circuit TI to the reset switch SW2 via the isolator IO2.

Next, a first sensing drive in the present eighth embodiment will be explained.

During a first sensing drive period, the timing control circuit TI outputs a sixth synchronization signal Sy6 and a seventh synchronization signal Sy7, which has a polarity inverted from the polarity of the sixth synchronization signal Sy6, respectively. The timing control circuit TI has a third output unit OU3, and the sixth synchronization signal Sy6 is output from the third output unit OU3. The sixth synchronization signal Sy6 is given to the reset switch SW2 of the detection circuit DC via the isolator IO2. The seventh synchronization signal Sy7 is given to a first amplifier AP1. The first amplifier AP1 amplifies the seventh synchronization signal Sy7, and an amplified seventh synchronization signal Sy7α is given to each of a floating ground line, the first electrode E1, and the third electrodes E3. Subsequently, a detector IN synchronizes with the sixth synchronization signal Sy6, and reads the change in a sensor signal generated at the second electrode E2. Note that the on/off of the reset switch SW2 is synchronized with the sixth synchronization signal Sy6.

In the eighth embodiment configured as described above, the same effects as in the first embodiment above can be obtained.

Ninth Embodiment

Next, a display device DSP of a ninth embodiment will be described. FIG. 23 is a perspective diagram showing a configuration of the display device DSP according to the ninth embodiment.

As shown in FIG. 23, in the present ninth embodiment, the display device DSP is a liquid crystal display device. The display device DSP comprises a panel PNL, a drive IC chip IC1 that drives the panel PNL, a capacitive sensor SE, a drive IC chip IC2 that drives the sensor SE, a backlight unit BL that illuminates the panel PNL, a control module CM, and flexible printed circuits FPC1, FPC2, FPC3, etc. In the present ninth embodiment, the panel PNL is, as a display panel, an active matrix type liquid crystal display panel. The display device DSP comprises any one of the plurality of sensor devices SD described above.

The panel PNL comprises a flat plate-shaped first substrate SUB1, a flat plate-shaped second substrate SUB2 arranged facing the first substrate SUB1, and a liquid crystal layer (liquid crystal layer LI described later) as a display function layer sandwiched between the first substrate SUB1 and the second substrate SUB2. Note that, in the present embodiment, the first substrate SUB1 can be referred to as an array substrate, and the second substrate SUB2 can be referred to as a counter-substrate, respectively. The panel PNL comprises a display area (active area) DA for displaying images. This panel PNL is a transmissive liquid crystal display panel with a transmissive display function that displays images by selectively transmitting a backlight from the backlight unit BL. Note that, the panel PNL may also be a transreflective liquid crystal display panel with a reflective display function that displays images by selectively reflecting external light, in addition to the transmissive display function.

The backlight unit BL is arranged on the back side of a first substrate SUB1. Various forms of such a backlight unit BL are applicable, such as one using a light emitting diode (LED) or a cold cathode tube (CCFL) as a light source. The detailed structure is not described here. Note that, in a case where the panel PNL is a reflective type panel with only a reflective display function, the backlight unit BL is omitted.

The sensor SE comprises a plurality of detection electrodes Rx. These detection electrodes Rx are provided above the outer surface of a screen side that displays an image of the panel PNL, for example. Therefore, the detection electrodes Rx may be in contact with a second substrate SUB2, or may be located separately from the second substrate SUB2. In the present embodiment, the detection electrodes Rx are in contact with the outer surface of the second substrate SUB2. Here, the above-mentioned outer surface is a surface on the opposite side of a surface of the second substrate SUB2 facing the first substrate SUB1, and includes a display surface on which images are displayed. In the example shown in the drawing, each detection electrode Rx extends substantially in a first direction d1 and is lined up in a second direction d2 that intersects the first direction d1. Note that each detection electrode Rx may extend in the second direction d2 and line up in the first direction d1, or may be formed in an island shape and arranged in a matrix in the first direction d1 and the second direction d2.

The drive IC chip IC1 as a drive unit is mounted on the first substrate SUB1 of the panel PNL. The flexible printed circuit FPC1 connects the panel PNL to the control module CM. The flexible printed circuit FPC2 connects the detection electrode Rx of the sensor SE to the control module CM. The drive IC chip IC2 as a drive unit is mounted on the control module CM. The flexible printed circuit FPC3 connects the backlight unit BL to the control module CM.

The drive IC chip IC1 and the drive IC chip IC2 are connected via the flexible printed circuit FPC2, etc. For example, in a case where the flexible printed circuit FPC2 includes a branch FPCB connected on the first substrate SUB1, the drive IC chip IC1 and drive IC chip IC2 may be connected via the branch FPCB and a wiring line on the first substrate SUB1. In addition, the drive IC chip IC1 and the drive IC chip IC2 may be connected via flexible printed circuits FPC1 and FPC2.

FIG. 24 shows a basic configuration and equivalent circuit of the above display device DSP.

As shown in FIG. 24, in addition to the panel PNL, etc., the display device DSP comprises the drive IC chip IC1 and a gate line driving circuit GDC, etc., located in a non-display area NDA outside the display area DA. In the present embodiment, the drive IC chip IC1 comprises a source line driving circuit SDC and a common electrode driving circuit CDC. Note that the drive IC chip IC1 may comprise at least a part of the source line driving circuit SDC and the common electrode driving circuit CDC. The shape of the non-display area NDA is a frame shape (rectangular frame shape) surrounding the display area DA.

The panel PNL comprises a plurality of pixels PX in the display area DA. The plurality of pixels PX are provided in a matrix in the first direction d1 and the second direction d2, and m×n pieces thereof are arranged (where m and n are positive integers). Furthermore, in the display area DA, the panel PNL comprises n gate lines G (G1 to Gn), m source lines S (S1 to Sm), common electrode CE, etc.

The gate lines G extend substantially linearly in the first direction d1, are drawn outside the display area DA, and are connected to the gate line driving circuit GDC. Furthermore, the gate lines G are arranged at intervals in the second direction d2. The source lines S extend substantially linearly in the second direction d2, are drawn outside the display area DA, and are connected to the source line driving circuit SDC. Furthermore, the source lines S are arranged at intervals in the first direction d1 and intersect the gate lines G. Note that the gate lines G and the source lines S do not necessarily have to be extended linearly, and some of them may be bent. The common electrode CE is provided in the display area DA and is electrically connected to the common electrode driving circuit CDC. This common electrode CE is shared by a plurality of pixels PX. The details of the common electrode CE will be described later.

Figure 25:
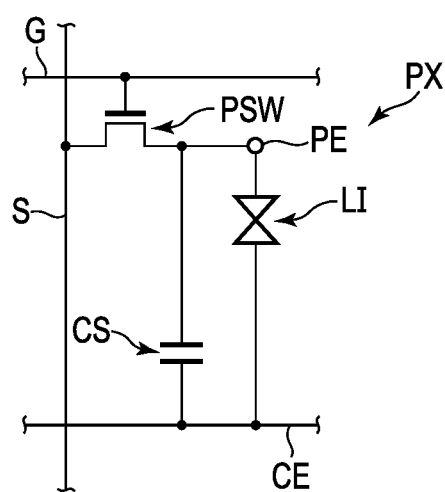
FIG. 25 is an equivalent circuit diagram of a pixel shown in FIG. 24.

FIG. 25 is an equivalent circuit diagram showing a pixel PX shown in FIG. 24.

As shown in FIG. 25, each pixel PX comprises a pixel switching element PSW, a pixel electrode PE, a common electrode CE, and a liquid crystal layer LI, etc. The pixel switching element PSW is formed by a thin-film transistor, for example. The pixel switching element PSW is electrically connected to the gate line G and the source line S. The pixel switching element PSW may be either a top gate type or a bottom gate type. Furthermore, a semiconductor layer of the pixel switching element PSW is formed, for example, of polycrystalline silicon; however, it may also be formed of amorphous silicon or an oxide semiconductor, etc. The pixel electrode PE is electrically connected to the pixel switching element PSW. The pixel electrode PE faces the common electrode CE. The common electrode CE, an insulating film, and the pixel electrode PE form a storage capacitor CS.

Figure 26:
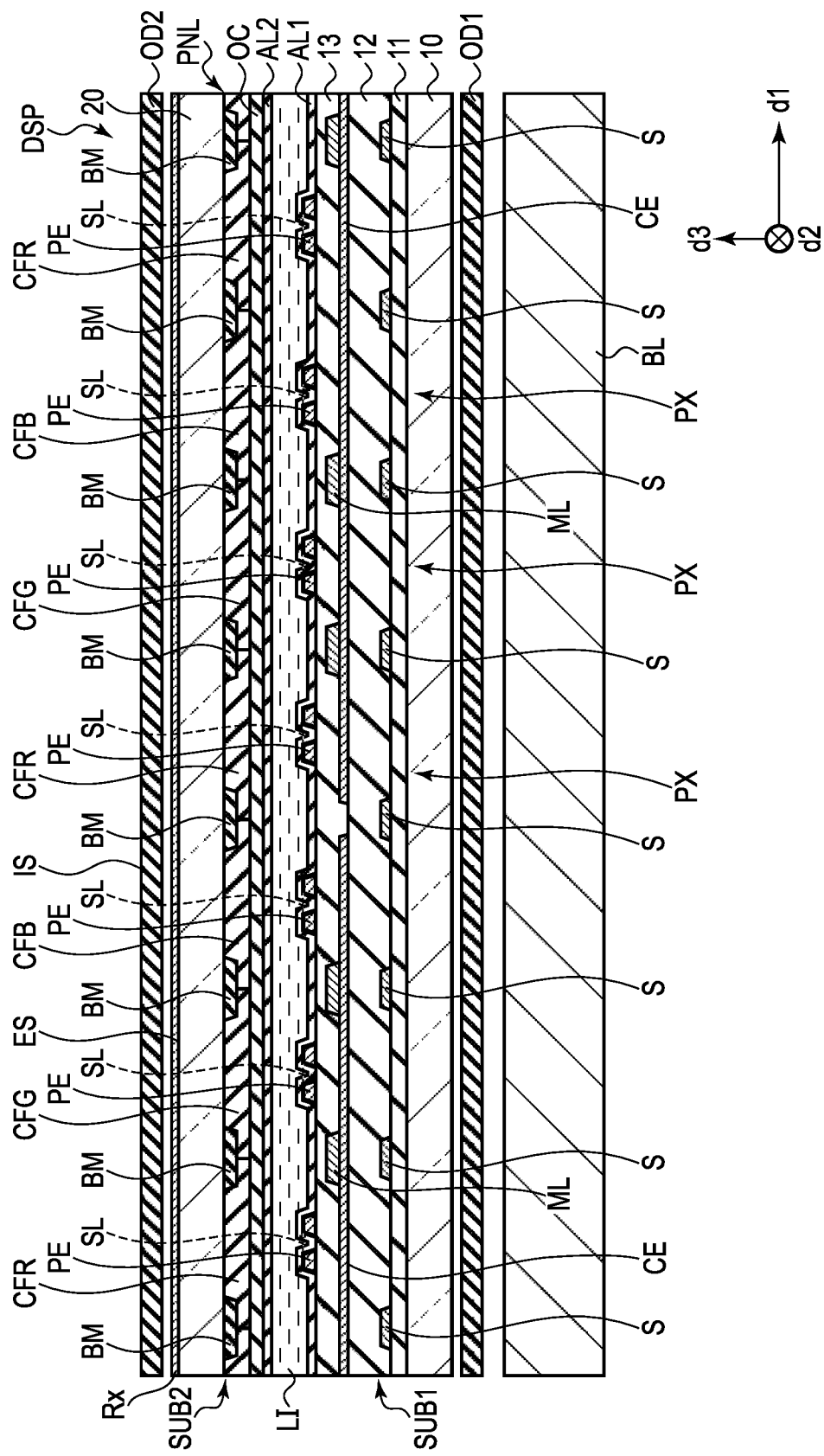
FIG. 26 is a cross-sectional view showing a part of a structure of the display device.

FIG. 26 is a cross-sectional view showing a part of the structure of the display device DSP.

As shown in FIG. 26, in addition to the panel PNL and the backlight unit BL described above, the display device DSP also comprises a first optical element OD1 and a second optical element OD2, etc. Note that the panel PNL shown in the drawing has a configuration corresponding to a fringe field switching (FFS) mode as the display mode; however, it may also have a configuration corresponding to other display modes. For example, the panel PNL may have a configuration corresponding to an in-plane switching (IPS) mode of the FFS mode, etc., which primarily uses a lateral electric field substantially parallel to a substrate main surface. In the display mode that uses a lateral electric field, for example, a configuration in which both the pixel electrode PE and the common electrode CE are provided on the first substrate SUB1 is applicable.

Alternatively, the panel PNL may have a configuration corresponding to a mode, such as a twisted nematic (TN) mode, an optically compensated bend (OCB) mode, vertical aligned (VA) mode, etc., that primarily uses a longitudinal electric field substantially perpendicular to the substrate main surface. In the display mode using the longitudinal electric field, for example, a configuration in which the pixel electrode PE is provided on the first substrate SUB1 and the common electrode CE is provided on the second substrate SUB2 is applicable. Note that the substrate main surface here is a surface parallel to a plane defined by the first direction d1 and the second direction d2 orthogonal to each other.

The panel PNL comprises the first substrate SUB1, the second substrate SUB2, and the liquid crystal layer LI. The first substrate SUB1 and the second substrate SUB2 are bonded together with a predetermined gap formed between them. The liquid crystal layer LI is encapsulated in the gap between the first substrate SUB1 and the second substrate SUB2.

The first substrate SUB1 is formed using a light transmissive first insulating substrate 10 such as a glass substrate or resin substrate. The first substrate SUB1 comprises the source lines S, the common electrode CE, the pixel electrodes PE, a first insulating layer 11, a second insulating layer 12, a third insulating layer 13, and a first alignment film AL1, etc., on the side of the first insulating substrate 10 facing the second substrate SUB2.

The first insulating layer 11 is arranged on the first insulating substrate 10. Note that, although not described in detail, in the present embodiment, for example, a pixel switching element with a top gate structure is applied. In such an embodiment, the first insulating layer 11 includes a plurality of insulating layers laminated in a third direction d3. For example, the first insulating layer 11 includes various insulating layers such as an undercoat layer interposed between the first insulating substrate 10 and the semiconductor layer of the pixel switching element, a gate insulating layer interposed between the semiconductor layer and a gate electrode, and an interlayer insulating layer interposed between the gate electrode and source/drain electrodes. In the same manner as the gate electrode, a gate line is arranged between the gate insulating layer and the interlayer insulating layer. The source line S is formed on the first insulating layer 11. The source electrode and the drain electrode of the pixel switching element, etc., are also formed on the first insulating layer 11. In the example shown in the drawing, the source line S extends in the second direction d2.

The second insulating layer 12 is arranged on the source line S and the first insulating layer 11. The common electrode CE is formed on the second insulating layer 12. The common electrode CE is formed of transparent conductive materials such as indium tin oxide (ITO) and indium zinc oxide (IZO). Note that, in the example shown in the drawing, metal layers ML are formed on the common electrode CE to reduce the resistance of the common electrode CE; however, the metal layers ML may be omitted.

The third insulating layer 13 is arranged on the common electrode CE and the second insulating layer 12. The pixel electrodes PE are formed on the third insulating layer 13. Each pixel electrode PE is located between adjacent source lines S, respectively, and faces the common electrode CE. In addition, each pixel electrode PE has a slit SL at a position facing the common electrode CE. The pixel electrodes PE are formed of transparent conductive materials such as ITO or IZO. The first alignment film AL1 covers the pixel electrodes PE and the third insulating layer 13.

On the other hand, the second substrate SUB2 is formed using a light transmissive second insulating substrate 20 such as a glass substrate or resin substrate. The second substrate SUB2 comprises a black matrix BM, color filters CFR, CFG, and CFB, an overcoat layer OC, and a second alignment film AL2 on the side of the second insulating substrate 20 facing the first substrate SUB1.

The black matrix BM is formed on the inner surface of the second insulating substrate 20 and partitions each pixel. The color filters CFR, CFG, and CFB are formed on the inner surface of the second insulating substrate 20, respectively, and a part of them overlaps the black matrix BM. The color filter CFR is a red colored filter arranged on a red pixel and is formed of a red resin material. The color filter CFG is a green colored filter arranged on a green pixel, and is formed of a green resin material. The color filter CFB is a blue colored filter arranged on a blue pixel, and is formed of a blue resin material.

The example shown in the drawing corresponds to a case in which a unit pixel, which is the smallest unit of configuring a color image, is configured by three color pixels of a red pixel, a green pixel, and a blue pixel. However, the unit pixel is not limited to a combination of the above three color pixels. For example, a unit pixel may be configured by four color pixels, adding a white pixel to the red pixel, the green pixel, and the blue pixel. In this case, a white colored filter or a transparent filter may be arranged on the white pixel, or the filter of the white pixel itself may be omitted. The overcoat layer OC covers the color filters CFR, CFG, and CFB. The overcoat layer OC is formed of a transparent resin material. The second alignment film AL2 covers the overcoat layer OC.

The detection electrode Rx is formed above the outer surface of the second insulating substrate 20. The detailed structure of this detection electrode Rx will be described later. In addition, the drawing here is simplified and omits a lead line L, which will be described later. In the present embodiment, the detection electrode Rx is formed of a conductive material, for example, metal. Note that the detection electrode Rx may be formed of a transparent conductive material such as ITO, IZO, etc., or by a combination (aggregate) of a metal (e.g., metal wire) and a transparent conductive material (e.g., transparent conductive layer). Each detection electrode Rx faces the common electrode CE through dielectric materials such as the third insulating layer 13, the first alignment film AL1, the liquid crystal layer LI, the second alignment film AL2, the overcoat layer OC, the color filters CFR, CFG, and CFB, and the second insulating substrate 20.

The first optical element OD1 is arranged between the first insulating substrate 10 and the backlight unit BL. The second optical element OD2 is arranged above the detection electrode Rx. The first optical element OD1 and the second optical element OD2 each contain at least a polarizer and may include a retardation film if necessary. An absorption axis of the polarizer included in the first optical element OD1 and an absorption axis of the polarizer included in the second optical element OD2 are orthogonal to each other. Furthermore, in this example, an input surface of the display device DSP is a surface of the second optical element OD2. The display device DSP is capable of detecting input information, etc., input by an input means to the input surface.

Next, the capacitive sensor SE provided in the display device DSP of the present embodiment will be described.

Figure 27:
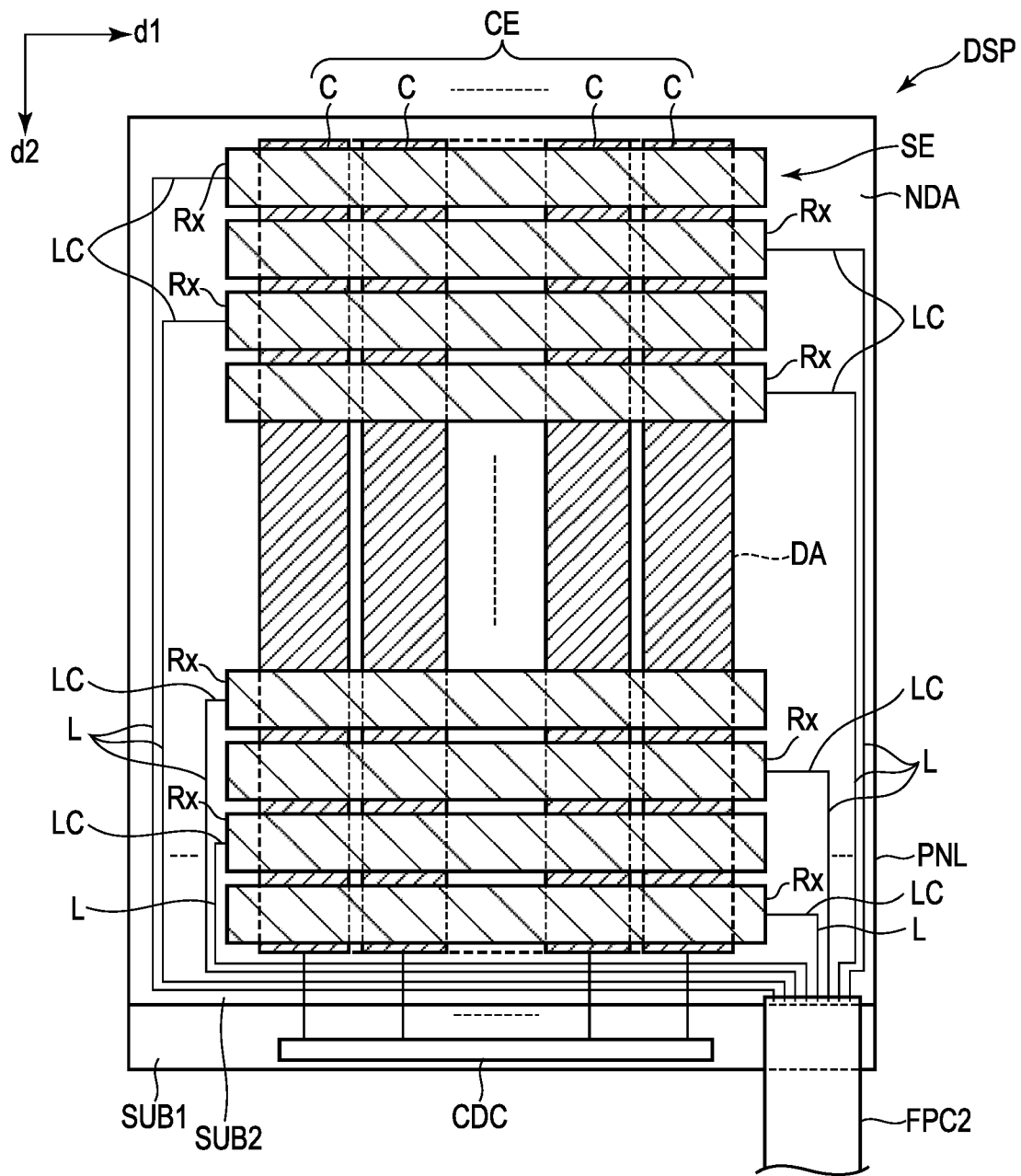
FIG. 27 is a plan view showing a panel and a flexible printed circuit according to the ninth embodiment.

FIG. 27 shows a plan view of the panel PNL and the flexible printed circuit FPC2 according to the present embodiment. In FIG. 27, the above drive IC chip IC1 is omitted; however, as described above, the common electrode driving circuit CDC is provided in the drive IC chip IC1.

As shown in FIG. 27, the sensor SE of the present embodiment comprises the common electrode CE on the first substrate SUB1 side, the detection electrodes Rx, the lead lines L, and connection lines LC on the second substrate SUB2 side. In other words, the common electrode CE functions as a display electrode as well as a sensor drive electrode.

The common electrode CE and the detection electrode Rx are arranged on the display area DA. In the example shown in the drawing, in the display area DA, the common electrode CE comprises a plurality of divisional electrodes C, each of which is lined up at intervals in the first direction d1, extends substantially linearly in the second direction d2, and is formed in a band shape. Of the plurality of divisional electrodes C, the divisional electrode C located outermost in the display area DA in the first direction d1 has one side edge facing the lead line L, and the one side edge planarly overlaps the outer peripheral edge of the display area DA.

Note that, in the present embodiment, the term "planar" refers to a state in which the panel PNL is viewed in planar view. In other words, "planar" refers to a state where the panel PNL is viewed from a direction normal to the display surface (a state when the panel PNL is viewed from the opposite direction of the third direction d3 in FIG. 23). For this reason, "planarly" can be rephrased as "in a state where the panel PNL is viewed from the opposite direction of the third direction d3".

In the present embodiment, the display area DA is rectangular, the lead lines L are located in the non-display area NDA of the second substrate SUB2, the upper side of each divisional electrode C planarly overlaps the upper edge of the display area DA, the lower side of each divisional electrode C planarly overlaps the lower edge of the display area DA, and one side edge of each divisional electrode C at both ends of the plurality of divisional electrodes C facing the lead line L planarly overlaps the outer peripheral edge of the display area DA.

In the display area DA, the detection electrodes Rx are respectively lined up at intervals in the second direction d2 and extend substantially linearly in the first direction d1. In other words, here, the detection electrodes Rx extend in a direction intersecting the divisional electrodes C. A detection electrode Rx is formed by a plurality of metal wires. The common electrode CE (the plurality of divisional electrodes C extending in the second direction d2) and the plurality of detection electrodes Rx extending in the first direction d1 face each other with various dielectric materials interposed therebetween, as described above.

The number, size, and shape of the divisional electrodes C are not particularly limited and can be changed in various ways. As in the example described below, the common electrodes CE may also be lined up at intervals in the second direction d2 and extend substantially linearly in the first direction d1. Furthermore, the common electrode CE may be a single flat electrode formed continuously in the display area DA without being divided.

The lead line L is provided above the second substrate SUB2 in the non-display area NDA. The connection line LC is provided above the second substrate SUB2 and connects the lead line L to the detection electrode Rx. In the present embodiment, the connection line LC extends in the first direction d1. The lead line L is electrically connected to the detection electrode Rx on a one-to-one basis via the connection line LC. Each of the lead lines L outputs the change in the sensor signal generated at the detection electrode Rx to the flexible printed circuit FPC2 side.

The display device DSP further comprises the common electrode driving circuit CDC arranged in the non-display area NDA. Each of the divisional electrodes C is electrically connected to the common electrode driving circuit CDC.

The flexible printed circuit FPC2 is connected to a group of outer lead bonding (OLB) pads located above the second substrate SUB2 in the non-display area NDA. Each pad of the OLB pad group is electrically connected to the detection electrode Rx via the lead line L and the connection line LC. In the present embodiment, not only the detection electrode Rx, but also the connection line LC and the lead line L are formed of metal as a conductive material.

In the present ninth embodiment, the common electrode CE corresponds to the above first electrode E1, and the detection electrode Rx corresponds to the above second electrode E2. The third insulating layer 13, the overcoat layer OC, the color filters CFR, CFG, and CFB, and the second insulating substrate 20 respectively correspond to the above insulating layer INS. The control module CM and the drive IC chip IC2 correspond to the above control circuit CC. The drive IC chip IC2 corresponds to the above detection circuit DC.

The common electrode CE corresponds to the above first electrode E1. The detection electrode Rx corresponds to the above second electrode E2. In the present ninth embodiment, the third electrode E3 is not shown in the drawing; however, the third electrode E3 may or may not be provided in the display device DSP.

The display area DA corresponds to the above first area A1, and the non-display area NDA corresponds to the above second area A2. However, the display area DA does not have to correspond to the above first area A1, and the non-display area NDA does not have to correspond to the above second area A2.

The aggregate of the gate line driving circuit GDC, the drive IC chip IC1, the drive IC chip IC2, the control module CM, etc., correspond to the above control circuit CC. The drive IC chip IC1 functions as a third circuit.

The display device DSP of the present ninth embodiment can use the common electrode CE, the pixel electrodes PE, the liquid crystal layer LI, etc., to perform display drive. During the display drive period for displaying images, the common electrode driving circuit CDC applies a common voltage to the common electrode CE. The source line driving circuit SDC provides an image signal (e.g., video signal) to each of the pixel electrodes PE.

In addition, the display device DSP can use the common electrode CE, the detection electrodes Rx, etc., to perform the first sensing drive during the first sensing drive period, or perform the second sensing drive during the second sensing drive period. For example, during the first sensing drive period, the control module CM can provide a synchronization signal such as the second synchronization signal $Sy2\alpha$ to the common electrode CE via the branch FPCB, the drive IC chip IC1, etc.

The ninth embodiment configured as described above can also obtain the same effects as in the embodiments described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the ninth embodiment described above, a liquid crystal display device is disclosed as an example of the display device. However, the above-mentioned embodiments are applicable to any flat panel type display device, such as organic EL (electroluminescent) display devices, other self-luminous display devices, or electronic paper type display devices having electrophoretic elements, etc. It also goes without saying that the above-mentioned embodiments can be applied to small and medium-sized display devices to large display devices without any particular limitation.

The contents of the present invention are described below.

[1] A sensor device comprising:
a panel including an insulating layer, a first electrode provided on a first main surface side of the insulating layer, and a second electrode provided on a second main surface side opposite the first main surface of the insulating layer and sandwiching the insulating layer together with the first electrode; and
a control circuit including a first circuit including a timing control circuit and a first amplifier, and a second circuit including a detection circuit connected to a floating ground line and electrically isolated from the first circuit,
the detection circuit including a detector electrically connected to the second electrode, and a first output unit,
during a first sensing drive period,
the first output unit outputting a first synchronization signal,
the timing control circuit outputting a second synchronization signal generated based on the first synchronization signal and having a polarity inverted from the polarity of the first synchronization signal,
the first amplifier amplifying the second synchronization signal and providing the amplified second synchronization signal to each of the floating ground line and the first electrode, and
the detector reading a change in a sensor signal generated at the second electrode.

[2] The sensor device of [1], wherein
the panel further includes a third electrode provided on the second main surface side of the insulating layer,
the first electrode and the second electrode are located in a first area,
the third electrode is located in a second area outside the first area, and
during the first sensing drive period,
the first amplifier further provides the amplified second synchronization signal to the third electrode.

[3] The sensor device of [1], wherein
the detection circuit further comprises a second output unit, and
during a second sensing drive period,
the second output unit outputs a third synchronization signal,
the timing control circuit outputs a fourth synchronization signal generated based on the third synchronization signal and having the same polarity as that of the third synchronization signal,
the first amplifier amplifies the fourth synchronization signal and provides the amplified fourth synchronization signal to each of the floating ground line and the first electrode, the detection circuit writes a write signal to the second electrode, and the detector reads the sensor signal generated at the second electrode, which is a change in the write signal.

[4] The sensor device of [3], wherein the panel further includes a third electrode provided on the second main surface side of the insulating layer, the first electrode and the second electrode are located in a first area, the third electrode is located in a second area outside the first area, and during the second sensing drive period, the first amplifier further provides the amplified fourth synchronization signal to the third electrode.

[5] The sensor device of [1], wherein the panel further includes a third electrode provided on the second main surface side of the insulating layer, the first electrode and the second electrode are located in a first area, the third electrode is located in a second area outside the first area, the first circuit further includes a second amplifier, during the first sensing drive period, the second amplifier amplifies the second synchronization signal and provides the amplified second synchronization signal to the third electrode, and an amplitude of the second synchronization signal amplified by the second amplifier is greater than an amplitude of the second synchronization signal amplified by the first amplifier.

[6] The sensor device of [1], wherein the panel further includes a third electrode provided on the second main surface side of the insulating layer, the first electrode and the second electrode are located in a first area, the third electrode is located in a second area outside the first area, the first circuit further includes a second amplifier, during the first sensing drive period, the timing control circuit outputs a fifth synchronization signal generated based on the first synchronization signal and having a polarity inverted from the polarity of the first synchronization signal, and the second amplifier amplifies the fifth synchronization signal and provides the amplified fifth synchronization signal to the third electrode, and an amplitude of the fifth synchronization signal amplified by the second amplifier is greater than an amplitude of the second synchronization signal amplified by the first amplifier.

[7] The sensor device of [1], wherein the panel further comprises a plurality of third electrodes provided on the second main surface side of the insulating layer and electrically insulated from each other, the first electrode and the second electrode are located in a first area, the plurality of third electrodes are located in a second area outside the first area and are arranged at intervals from each other along the second area, the first circuit further includes a plurality of second amplifiers electrically connected to the plurality of third electrodes on a one-to-one basis, during the first sensing drive period, the timing control circuit outputs a plurality of fifth synchronization signals generated based on the first synchronization signal and having a polarity inverted from the polarity of the first synchronization signal, and each of the second amplifiers amplifies the corresponding fifth synchronization signal and provides the amplified fifth synchronization signal to the corresponding third electrode, and an amplitude of the fifth synchronization signal amplified by each of the second amplifier is greater than an amplitude of the second synchronization signal amplified by the first amplifier.

[8] A sensor device comprising:

a panel including an insulating layer, a first electrode provided on a first main surface side of the insulating layer, a second electrode provided on a second main surface side opposite the first main surface of the insulating layer and sandwiching the insulating layer together with the first electrode, and a third electrode provided on the second main surface side of the insulating layer; and a control circuit including a first circuit including a timing control circuit, a first amplifier, and a second amplifier, and a second circuit including a detection circuit connected to a floating ground line and electrically isolated from the first circuit, the first electrode and the second electrode being located in a first area, the third electrode being located in a second area outside of the first area, the detection circuit including a detector electrically connected to the second electrode, and a first output unit, during a first sensing drive period, the first output unit outputting a first synchronization signal, the timing control circuit outputting a second synchronization signal generated based on the first synchronization signal and having a polarity inverted from the polarity of the first synchronization signal, and outputting a fifth synchronization signal generated based on the first synchronization signal and having the same polarity as that of the first synchronization signal, the first amplifier amplifying the second synchronization signal and providing the amplified second synchronization signal to each of the floating ground line and the third electrode, the second amplifier amplifying the fifth synchronization signal and providing the amplified fifth synchronization signal to the first electrode, and the detector reading a change in a sensor signal generated at the second electrode.

[9] A sensor device comprising:

a panel including an insulating layer, a first electrode provided on a first main surface side of the insulating layer, a second electrode provided on a second main surface side opposite a first main surface of the insulating layer and sandwiching the insulating layer together with the first electrode; and a control circuit including a first circuit including a timing control circuit and a first amplifier, and a second circuit including a detection circuit connected to a floating ground line and electrically isolated from the first circuit, the detection circuit including a detector electrically connected to the second electrode, during a first sensing drive period, the timing control circuit outputting a sixth synchronization signal and a seventh synchronization signal having a polarity inverted from the polarity of the sixth synchronization signal, respectively, the first amplifier amplifying the seventh synchronization signal, and providing the amplified seventh synchronization signal to each of the floating ground line and the first electrode, and the detector reading a change in a sensor signal generated at the second electrode in synchronization with the sixth synchronization signal.

[10] The sensor device of [9], wherein the panel further includes a third electrode provided on the second main surface side of the insulating layer, the first electrode and the second electrode are located in a first area, the third electrode is located in a second area outside the first area, and during the first sensing drive period, the first amplifier further provides the amplified seventh synchronization signal to the third electrode.

[11] A sensor device comprising:

a panel including an insulating layer, a first electrode provided on a first main surface side of the insulating layer, and a second electrode provided on a second main surface side opposite the first main surface of the insulating layer and sandwiching the insulating layer together with the first electrode; and a control circuit including a first circuit including a first amplifier and a second circuit including a detection circuit connected to a floating ground line and electrically isolated from the first circuit, the detection circuit including a detector electrically connected to the second electrode, and a second output unit, during a second sensing drive period, the second output unit outputting a third synchronization signal, the first amplifier amplifying the third synchronization signal, and providing the amplified third synchronization signal to each of the floating ground line and the first electrode, the detection circuit writing a write signal to the second electrode, and the detector reading a sensor signal generated at the second electrode, which is a change in the write signal.

[12] The sensor device of [11], wherein the panel further includes a third electrode provided on the second main surface side of the insulating layer, the first electrode and the second electrode are located in a first area, the third electrode is located in a second area outside the first area, and during the second sensing drive period, the first amplifier further provides the amplified third synchronization signal to the third electrode.

[13] A display device comprising the sensor device in any one of [1] to [12], wherein the panel is a display panel further comprising a pixel electrode and a display function layer, the control circuit further comprises a third circuit, and during a display drive period that displays an image, the third circuit applies a common voltage to the first electrode, and provides an image signal to the pixel electrode.

What is claimed is:

1. A sensor device comprising:

a panel including an insulating layer, a first electrode provided on a first main surface side of the insulating layer, and a second electrode provided on a second main surface side opposite the first main surface of the insulating layer and sandwiching the insulating layer together with the first electrode; and a control circuit including a first circuit including a timing control circuit and a first amplifier, and a second circuit including a detection circuit connected to a floating ground line and electrically isolated from the first circuit, the detection circuit including a detector electrically connected to the second electrode, and a first output unit, during a first sensing drive period, the first output unit outputting a first synchronization signal, the timing control circuit outputting a second synchronization signal generated based on the first synchronization signal and having a polarity inverted from the polarity of the first synchronization signal, the first amplifier amplifying the second synchronization signal and providing the amplified second synchronization signal to each of the floating ground line and the first electrode, and the detector reading a change in a sensor signal generated at the second electrode.

2. The sensor device of claim 1, wherein the panel further includes a third electrode provided on the second main surface side of the insulating layer, the first electrode and the second electrode are located in a first area, the third electrode is located in a second area outside the first area, and during the first sensing drive period, the first amplifier further provides the amplified second synchronization signal to the third electrode.

3. The sensor device of claim 1, wherein the detection circuit further comprises a second output unit, and during a second sensing drive period, the second output unit outputs a third synchronization signal, the timing control circuit outputs a fourth synchronization signal generated based on the third synchronization signal and having the same polarity as that of the third synchronization signal, the first amplifier amplifies the fourth synchronization signal and provides the amplified fourth synchronization signal to each of the floating ground line and the first electrode, the detection circuit writes a write signal to the second electrode, and the detector reads the sensor signal generated at the second electrode, which is a change in the write signal.

4. The sensor device of claim 3, wherein the panel further includes a third electrode provided on the second main surface side of the insulating layer, the first electrode and the second electrode are located in a first area, the third electrode is located in a second area outside the first area, and during the second sensing drive period, the first amplifier further provides the amplified fourth synchronization signal to the third electrode.

5. The sensor device of claim 1, wherein the panel further includes a third electrode provided on the second main surface side of the insulating layer, the first electrode and the second electrode are located in a first area, the third electrode is located in a second area outside the first area, the first circuit further includes a second amplifier, during the first sensing drive period, the second amplifier amplifies the second synchronization signal and provides the amplified second synchronization signal to the third electrode, and an amplitude of the second synchronization signal amplified by the second amplifier is greater than an amplitude of the second synchronization signal amplified by the first amplifier.

6. The sensor device of claim 1, wherein the panel further includes a third electrode provided on the second main surface side of the insulating layer, the first electrode and the second electrode are located in a first area, the third electrode is located in a second area outside the first area, the first circuit further includes a second amplifier, during the first sensing drive period, the timing control circuit outputs a fifth synchronization signal generated based on the first synchronization signal and having a polarity inverted from the polarity of the first synchronization signal, and the second amplifier amplifies the fifth synchronization signal and provides the amplified fifth synchronization signal to the third electrode, and an amplitude of the fifth synchronization signal amplified by the second amplifier is greater than an amplitude of the second synchronization signal amplified by the first amplifier.

7. The sensor device of claim 1, wherein the panel further comprises a plurality of third electrodes provided on the second main surface side of the insulating layer and electrically insulated from each other, the first electrode and the second electrode are located in a first area, the plurality of third electrodes are located in a second area outside the first area and are arranged at intervals from each other along the second area, the first circuit further includes a plurality of second amplifiers electrically connected to the plurality of third electrodes on a one-to-one basis, during the first sensing drive period, the timing control circuit outputs a plurality of fifth synchronization signals generated based on the first synchronization signal and having a polarity inverted from the polarity of the first synchronization signal, and each of the second amplifiers amplifies the corresponding fifth synchronization signal and provides the amplified fifth synchronization signal to the corresponding third electrode, and an amplitude of the fifth synchronization signal amplified by each of the second amplifier is greater than an amplitude of the second synchronization signal amplified by the first amplifier.

8. A sensor device comprising:

a panel including an insulating layer, a first electrode provided on a first main surface side of the insulating layer, a second electrode provided on a second main surface side opposite the first main surface of the insulating layer and sandwiching the insulating layer together with the first electrode, and a third electrode provided on the second main surface side of the insulating layer; and a control circuit including a first circuit including a timing control circuit, a first amplifier, and a second amplifier, and a second circuit including a detection circuit connected to a floating ground line and electrically isolated from the first circuit, the first electrode and the second electrode being located in a first area, the third electrode being located in a second area outside of the first area, the detection circuit including a detector electrically connected to the second electrode, and a first output unit, during a first sensing drive period, the first output unit outputting a first synchronization signal, the timing control circuit outputting a second synchronization signal generated based on the first synchronization signal and having a polarity inverted from the polarity of the first synchronization signal, and outputting a fifth synchronization signal generated based on the first synchronization signal and having the same polarity as that of the first synchronization signal, the first amplifier amplifying the second synchronization signal and providing the amplified second synchronization signal to each of the floating ground line and the third electrode, the second amplifier amplifying the fifth synchronization signal and providing the amplified fifth synchronization signal to the first electrode, and the detector reading a change in a sensor signal generated at the second electrode.

* * * * *